United States Patent
Bell et al.

(10) Patent No.: US 9,503,886 B2
(45) Date of Patent: *Nov. 22, 2016

(54) SYSTEMS, METHODS AND ARTICLES FOR PROVIDING COMMUNICATIONS AND SERVICES VIA A PEER-TO-PEER NETWORK OVER A DATA TRANSPORT LINK

(71) Applicant: Nuance Communications, Inc., Burlington, MA (US)

(72) Inventors: Jack W. Bell, Lynnwood, WA (US); Stephen Fishburn, Maple Valley, WA (US)

(73) Assignee: Nuance Communications, Inc., Burlington, MA (US)

( * ) Notice: Subject to any disclaimer, the term of this patent is extended or adjusted under 35 U.S.C. 154(b) by 165 days.

This patent is subject to a terminal disclaimer.

(21) Appl. No.: 14/486,837

(22) Filed: Sep. 15, 2014

(65) Prior Publication Data

US 2015/0003258 A1    Jan. 1, 2015

Related U.S. Application Data

(63) Continuation of application No. 13/114,830, filed on May 24, 2011, now Pat. No. 8,868,679.

(60) Provisional application No. 61/347,746, filed on May 24, 2010.

(51) Int. Cl.
*H04W 8/22* (2009.01)
*B60R 25/00* (2013.01)
(Continued)

(52) U.S. Cl.
CPC ............... *H04W 8/22* (2013.01); *B60R 25/00* (2013.01); *G06F 13/00* (2013.01); *G07C 5/008* (2013.01);
(Continued)

(58) Field of Classification Search
CPC ........ H04L 67/00; H04L 12/00; H04W 8/00; H04W 24/00; H04W 84/00; H04M 1/00; H01Q 1/00; B60R 25/00; G06F 13/11; G07C 5/00
See application file for complete search history.

(56) References Cited

U.S. PATENT DOCUMENTS

| 6,157,953 A | 12/2000 | Chang et al. |
| 7,093,017 B1 * | 8/2006 | Olgaard ............... H04W 8/245 709/223 |

(Continued)

OTHER PUBLICATIONS

Nicholson et al., "Systems, Methods and Articles for Providing Communications and Services Involving Automobile Head Units and User Preferences," Office Action mailed Oct. 10, 2014, for U.S. Appl. No. 13/756,425, 16 pages.

(Continued)

*Primary Examiner* — Andrew Lai
*Assistant Examiner* — Sumitra Ganguly
(74) *Attorney, Agent, or Firm* — Seed IP Law Group LLP

(57) ABSTRACT

Network communications, Web-based services and customized services using the Web-based services may be provided over a peer-to-peer network from a first peer to a second peer (e.g., automobile head unit) wherein the first peer has a separate connection to a more general server-based network such as the Internet. A communications device application based on a peer communications framework component in communication with a peer network stack on the communications device may work as middleware, with a connection to both a more general server-based network such as the Internet and to an external device, such as a head unit of an automobile. Although the communications device has a separate connection out to the Internet via a general network stack co-existing on the same communications device, the peer network stack and the general network stack are not directly connected.

16 Claims, 9 Drawing Sheets

(51) Int. Cl.

| | | |
|---|---|---|
| *G06F 13/00* | (2006.01) | |
| *G07C 5/00* | (2006.01) | |
| *H01Q 1/32* | (2006.01) | |
| *H04M 1/00* | (2006.01) | |
| *H04W 76/00* | (2009.01) | |
| *H04W 88/04* | (2009.01) | |
| *H04W 88/06* | (2009.01) | |
| *H04W 4/00* | (2009.01) | |
| *H04W 4/02* | (2009.01) | |
| *H04W 8/18* | (2009.01) | |
| *H04W 24/08* | (2009.01) | |
| *H04L 12/64* | (2006.01) | |
| *H04L 29/08* | (2006.01) | |
| *H04W 84/12* | (2009.01) | |

(52) U.S. Cl.
CPC ........ *H01Q 1/3291* (2013.01); *H04L 12/6418* (2013.01); *H04M 1/00* (2013.01); *H04W 4/008* (2013.01); *H04W 4/02* (2013.01); *H04W 8/183* (2013.01); *H04W 24/08* (2013.01); *H04W 76/00* (2013.01); *H04W 88/04* (2013.01); *H04W 88/06* (2013.01); *H04L 67/12* (2013.01); *H04W 84/12* (2013.01)

(56) References Cited

U.S. PATENT DOCUMENTS

| | | | |
|---|---|---|---|
| 7,209,816 B2 | 4/2007 | Mueller | |
| 7,962,470 B2* | 6/2011 | Degenkolb | G06F 17/30893 |
| | | | 707/709 |
| 8,131,456 B2 | 3/2012 | Mahalingaiah et al. | |
| 8,412,406 B2 | 4/2013 | Johnson et al. | |
| 8,868,679 B2* | 10/2014 | Bell | B60R 25/00 |
| | | | 709/217 |
| 2003/0139179 A1 | 7/2003 | Fuchs et al. | |
| 2004/0054443 A1 | 3/2004 | Hall et al. | |
| 2005/0027438 A1 | 2/2005 | Rockett et al. | |
| 2005/0176482 A1 | 8/2005 | Raisinghani et al. | |
| 2006/0003803 A1 | 1/2006 | Thomas et al. | |
| 2006/0031571 A1 | 2/2006 | Banerjee et al. | |
| 2006/0122748 A1 | 6/2006 | Nou | |
| 2006/0166631 A1 | 7/2006 | Ross et al. | |
| 2007/0005206 A1 | 1/2007 | Zhang et al. | |
| 2007/0094276 A1 | 4/2007 | Isaac | |
| 2007/0094366 A1 | 4/2007 | Ayoub | |
| 2007/0136163 A1 | 6/2007 | Bell | |
| 2008/0032721 A1 | 2/2008 | MacDonald et al. | |
| 2009/0012675 A1 | 1/2009 | Laghrari et al. | |
| 2009/0024359 A1 | 1/2009 | Bibelhausen et al. | |
| 2009/0195370 A1 | 8/2009 | Huffman et al. | |
| 2009/0265633 A1 | 10/2009 | Lim et al. | |
| 2010/0057781 A1 | 3/2010 | Stohr | |
| 2010/0070107 A1 | 3/2010 | Berkobin et al. | |
| 2010/0131642 A1 | 5/2010 | Chalikouras et al. | |
| 2010/0222939 A1 | 9/2010 | Namburu et al. | |
| 2010/0234071 A1* | 9/2010 | Shabtay | H04B 7/0408 |
| | | | 455/562.1 |
| 2010/0313132 A1 | 12/2010 | Link, II | |
| 2011/0093846 A1 | 4/2011 | Moinzadeh et al. | |
| 2011/0143669 A1 | 6/2011 | Farrell et al. | |
| 2011/0187547 A1 | 8/2011 | Kweon | |
| 2011/0271183 A1* | 11/2011 | Bose | G06F 3/038 |
| | | | 715/702 |
| 2011/0289186 A1 | 11/2011 | Bell et al. | |
| 2011/0295724 A1 | 12/2011 | Hill | |
| 2012/0198080 A1 | 8/2012 | Yang et al. | |
| 2012/0203625 A1 | 8/2012 | Soloff | |
| 2012/0259947 A1 | 10/2012 | Park | |
| 2012/0270560 A1 | 10/2012 | Moshir et al. | |
| 2012/0324046 A1 | 12/2012 | Park | |
| 2013/0045678 A1 | 2/2013 | Lee | |
| 2013/0086518 A1 | 4/2013 | Park et al. | |
| 2013/0101125 A1 | 4/2013 | Peters et al. | |
| 2013/0179029 A1 | 7/2013 | Wang et al. | |
| 2013/0196638 A1 | 8/2013 | Kim et al. | |

OTHER PUBLICATIONS

"Internet protocol suite," Wikipedia, retrieved from URL=http://en.wikipedia.org/wiki/TCP?IP_model on Apr. 12, 2013, 14 pages.

"OSI model," Wikipedia, retrieved from URL=http://en.wikipedia.org/wiki/Osi_reference_model on Apr. 12, 2013, 13 pages.

"Web Services Glossary," *W3C Working Group Note*, Feb. 11, 2004, retrieved from URL=http://www.w3.org/TR/2004/NOTE-ws-gloss-20040211/, on Jan. 28, 2014, 19 pages.

Bell et al., "Systems, Methods and Articles for Providing Communications and Services Via a Peer-To-Peer Network Over a Data Transport Link," Office Action mailed May 20, 2013, for U.S. Appl. No. 13/114,830, 37 pages.

Bell et al., "Systems, Methods and Articles for Providing Communications and Services Via a Peer-To-Peer Network Over a Data Transport Link," Office Action mailed Nov. 7, 2013, for U.S. Appl. No. 13/114,830, 47 pages.

Bell et al., "Systems, Methods and Articles for Providing Communications and Services Via a Peer-To-Peer Network Over a Data Transport Link," Office Action mailed May 15, 2014, for U.S. Appl. No. 13/114,830, 24 pages.

Bell et al., "Systems, Methods and Articles for Providing Communications and Services Via a Peer-To-Peer Network Over a Data Transport Link," Notice of Allowance mailed Jul. 18, 2014, for U.S. Appl. No. 13/114,830, 8 pages.

Braden (ed.), "Requirements for Internet Hosts—Communication Layers," Request for Comments: 1122, Internet Engineering Task Force, Oct. 1989, 116 pages.

Braden (ed.), "Requirements for Internet Hosts—Application and Support," Request for Comments: 1123, Internet Engineering Task Force, Oct. 1989, 98 pages.

International Search Report and Written Opinion for International Patent Application No. PCT/US2012/053558, mailed Mar. 25, 2013, 14 pages.

Nicholson et al., "Systems, Methods and Articles for a Communications Device Providing Communications and Services Involving Automobile Head Units," U.S. Appl. No. 13/756,430, filed Jan. 31, 2013, 121 pages.

Nicholson et al., "Systems, Methods and Articles for a Communications Device Providing Communications and Services Involving Automobile Head Units," Notice of Allowance, for U.S. Appl. No. 13/756,430, mailed Jun. 27, 2013, 11 pages.

Nicholson et al., "Systems, Methods and Articles for a Communications Device Providing Communications and Services Involving Automobile Head Units," Notice of Allowance mailed Jun. 26, 2014, for U.S. Appl. No. 13/756,430, 8 pages.

Nicholson et al., "Systems, Methods and Articles for Providing Communications and Services Involving Automobile Head Units and User Preferences," U.S. Appl. No. 13/756,425, filed Jan. 31, 2013, 118 pages.

Nicholson et al., "Systems, Methods and Articles for Providing Communications and Services Involving Automobile Head Units and User Preferences," Office Action for U.S. Appl. No. 13/756,425, mailed Jun. 18, 2013, 16 pages.

Nicholson et al., "Systems, Methods and Articles for Providing Communications and Services Involving Automobile Head Units and User Preferences," Office Action mailed Oct. 7, 2013, for U.S. Appl. No. 13/756,425, 14 pages.

Nicholson et al., "Systems, Methods and Articles for Providing Communications and Services Involving Automobile Head Units and User Preferences," Office Action mailed Jul. 14, 2014, for U.S. Appl. No. 13/756,425, 17 pages.

Nicholson et al., "Systems, Methods and Articles for a Server Providing Communications and Services Involving Automobile Head Units," U.S. Appl. No. 13/756,436, filed Jan. 31, 2013, 119 pages.

(56) References Cited

OTHER PUBLICATIONS

Nicholson et al., "Systems, Methods and Articles for a Server Providing Communications and Services Involving Automobile Head Units," Office Action mailed Aug. 23, 2013, for U.S. Appl. No. 13/756,436, 19 pages.

Nicholson et al., "Systems, Methods and Articles for a Server Providing Communications and Services Involving Automobile Head Units," Office Action mailed Feb. 6, 2014, for U.S. Appl. No. 13/756,436, 16 pages.

Nicholson et al., "Systems, Methods and Articles for a Server Providing Communications and Services Involving Automobile Head Units," Notice of Allowance mailed May 8, 2014, for U.S. Appl. No. 13/756,436, 19 pages.

\* cited by examiner

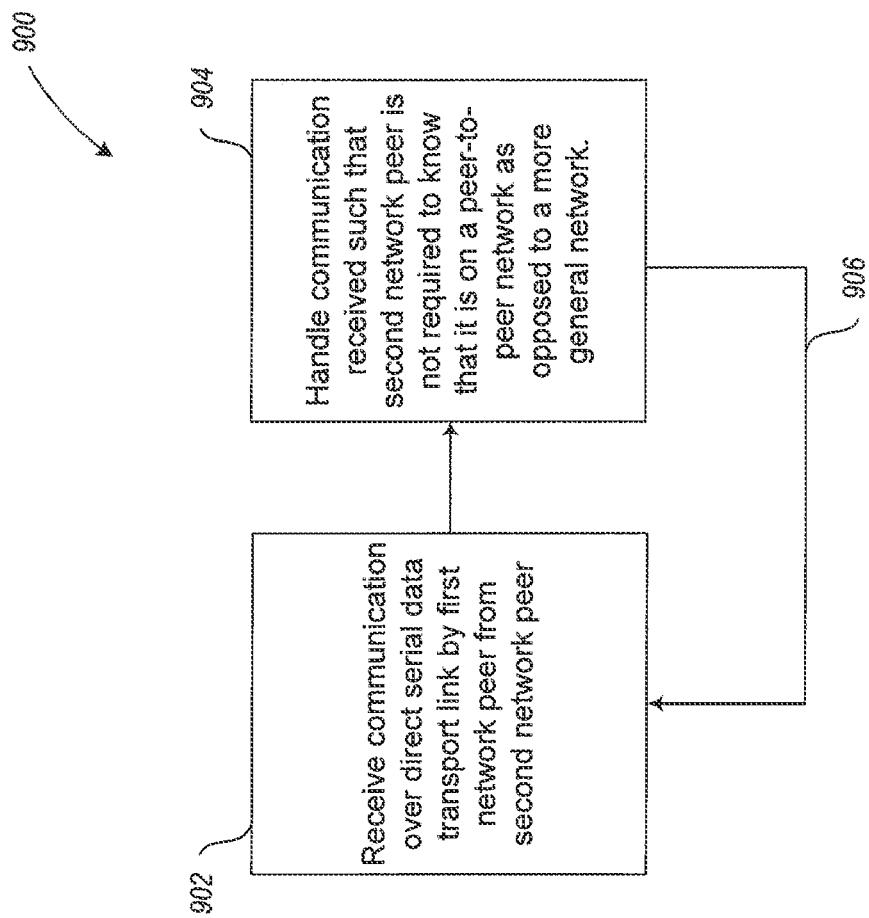

SYSTEMS, METHODS AND ARTICLES FOR PROVIDING COMMUNICATIONS AND SERVICES VIA A PEER-TO-PEER NETWORK OVER A DATA TRANSPORT LINK

BACKGROUND

1. Technical Field

This disclosure relates to providing communications and services to a device (e.g., vehicle head unit) that does not otherwise have a connection to a server-based network such as the Internet.

2. Description of the Related Art

As information services increasingly become Web-based, continuous or near continuous access to the Internet for communications and data processing devices becomes more important for end users and businesses to be able to access these services in a timely and useful manner.

For example, many communications devices such as cell phones, personal digital assistants and other hand-held form factor mobile communications devices implement Internet access functionality via cellular digital mobile telecommunications systems according to the International Mobile Telecommunications-2000 (IMT-2000), better known as the 3rd Generation (3G), family of standards for mobile telecommunications. However, many other devices such as vehicles, home appliances, and other isolated products having various embedded systems may not have such communications functionality built in, or may not have connections to particular communication service carriers or providers needed to access many Web-based services on the Internet.

One solution may be to use dial-up networking (DUN) functionality included on various mobile communications devices (e.g., Bluetooth® DUN) to operate the mobile communications device as a modem to allow another device that does not otherwise have Internet connectivity to access the Internet and Web-based services through the mobile communications device. However, many mobile communications devices do not have such DUN capability or such DUN functionality is disabled or switched off by the service provider, retailer or cell phone manufacturer.

Thus, an improved approach that provides connectivity and customized services to a device that does not otherwise have connectivity to a more general server-based network such as the Internet is desirable.

BRIEF SUMMARY

As described in detail herein, communications, Web-based services and customized services utilizing the Web-based services may be provided over a peer-to-peer network from a first peer to a second peer wherein the first peer has a separate connection to a more general server-based network such as the Internet. For example, the second peer may be a head unit of an automobile and the first peer may be a mobile communications device such as a cell phone, PDA or other communications device having a handheld form factor (i.e., handheld communications device). A communications device application based on a peer communications framework component in communication with a peer network stack on the handheld communications device may work as middleware, with a connection to both a more general server-based network such as the Internet and to an external device, such as the head unit. Although the handheld communications device has a separate connection out to the Internet via a general network stack co-existing on the communications device, the peer network stack and the general network stack are not directly connected.

A method of providing communications between a head unit of an automobile, a communications device having a handheld form factor, and a server-based network through which Internet access is provided, may be summarized as: receiving one or more requests via a peer-to-peer network stack by the communications device from the head unit over a serial data transport link between the head unit and the communications device; and performing a service specified in the one or more requests in response to the one or more requests, the service comprising: forwarding a request to the server-based network from the communications device via a general network stack separate from the peer-to-peer network stack; receiving a response from the server-based network via the general network stack; and forwarding at least a portion of the response to the head unit over the serial data transport link. Additional embodiments may include a determination of whether the request is to be handled by a service via an external server-based network and performing the service locally or via forwarding the request to the server-based network according to the determination.

The link and the performing of the service may occur irrespective of whether a network packet sent over the serial data transport link from the head unit containing the one or more requests includes the network address of the communications device as a destination network address. The method may further include configuring a user interface of the head unit to visually match a corresponding user interface of the communications device by communicating information over the serial data transport link from the communications device to the head unit, said information containing data adapted for use by the head unit to configure the user interface of the head unit to visually match the corresponding user interface of the communications device. Information included in the at least a portion of the response forwarded to the head unit may be for display on the user interface of the head unit configured to visually match the corresponding user interface of the communications device. The method may further include: receiving at least one additional request via the peer-to-peer network stack by the communications device from the head unit over a serial data transport link; determining whether the at least one additional request corresponds to a service on a specified list of services; and forwarding the at least one additional request to the server-based network from the communications device through the general network only if it was determined that the at least one additional request corresponds to a service on the specified list of services. The method may further include: caching at least a portion of the response on the communications device based upon previous monitoring on the server-based network types of and patterns of the received one or more requests. The serial data transport link between the head unit and the communications device may be either a Bluetooth® Serial Port Profile (SPP) type serial data transport link or Universal Serial Bus (USB) type serial data transport link.

A method for communicating in a communication network environment between a first and a second network peer over a direct serial data transport link between the first network peer and the second network peer, wherein there is an established data transport connection between the first network peer and the second network peer over the direct serial data transport link and wherein the first network peer has a separate connection over a separate network interface to a network external to the link, may be summarized as: receiving communications from the second network peer by the first network peer over the direct serial data transport link, the direct serial data transport link supporting at least one network in which only two network addresses are used at a given time on the network, the two network addresses consisting of a first network address for the first network peer and a second network address for the second network peer; extracting payloads by the first network peer from the communications irrespective of whether network packets containing the payloads include the first network address as a destination network address; and responding by the first network peer to a service request included in one or more of the communications received from the second network peer by providing data to the second network peer that was originally obtained by the first network peer through the separate connection to the network external to the direct serial data transport link, and wherein the established data transport connection between the first network peer and the second network peer on the direct serial data transport link is one in which resolution of network addresses of the first network peer and the second network peer to hardware addresses of the first network peer and the second network peer is not necessary for the responding by the first network peer to the service request.

The data provided to the second network peer may be over the established data transport connection between the first network peer and the second network peer. There may be second established connection using a separate transport on a separate network from the established data transport connection between the first network peer and the second network peer. The network external to the link may be a server-based network.

A method for communicating in a communication network environment between a first and a second network peer over a peer-to-peer network connection on a serial data transport link between the first network peer and the second network peer, may be summarized as: receiving communications from the second network peer by the first network peer on the peer-to-peer network connection over the serial data transport link, wherein the first network peer has particular network services available natively at the first network peer; and handling the communications received such that the second network peer may send communications over the serial data transport link including requests for one or more particular network services not available natively at the first network peer while keeping the peer-to-peer connection over the serial data transport link between the first network peer and the second network peer active and such that the handling the communications received from the second network peer enables the second network peer to handle network communications in a same manner irrespective of whether the one or more particular network services are available at all to the second network peer.

The peer-to-peer network connection may be a connection using Transmission Control Protocol/Internet Protocol (TCP/IP) and either Serial Line Internet Protocol (SLIP) or Point to Point Protocol (PPP). At least one of the one or more particular network services not available natively at the first network peer may be an Address Resolution Protocol (ARP) service or a Dynamic Host Configuration Protocol (DHCP) service.

A system may be summarized as including: at least one computer processor; at least one processor-readable storage medium coupled to the at least one computer processor; a peer communications control component under control of the at least one computer processor; a first communications component that is in operable communication with the peer communications control component and has a peer-to-peer network stack configured to receive requests through a data transport connection over a serial data transport link to a head unit of an automobile and forward requests to the peer communications control component; and a second communications component that is in operable communication with the peer communications control component and has a general network stack configured to send and receive communications from a server-based network that is external to the data transport connection and that is operable to provide Internet access, and wherein the second communications component is configured to: forward a request received from the first communications component via the peer communications control component to the server-based network via the general network stack; receive a response from the server-based network via the general network stack; and forward at least a portion of the response to the head unit over the serial data transport link.

The at least one computer processor, the at least one processor-readable storage medium, the peer communications control component, the first communications component, and the second communications component may all be housed within a communications device having a handheld form factor. The first communications component may send service requests to the head unit originating from one or more applications under control of one or more processors of the system and may send service requests to the head unit originating from the server-based network that is operable to provide Internet access. The first communications component and the head unit may each have a network address to use over the serial data transport link and the peer-to-peer network stack may receive the requests through the data transport connection irrespective of whether a network packet containing the one or more requests sent over the serial data transport link from the head unit includes the network address of the first communications component as a destination network address. The peer communications control component may configure a user interface of the head unit to visually match a corresponding user interface of the system by communicating information over the serial data transport link from the first communications component to the head unit, said information containing data adapted for use by the head unit to configure the user interface of the head unit to visually match the corresponding user interface of the system. Information included in the at least a portion of the response to forward to the head unit may be for display on the user interface of the head unit configured to visually match the corresponding user interface of the communications device. The peer communications control component may determine whether one or more requests received through the first communications component from the head unit corresponds to a service on a specified list of services and, if it is determined that the one or more requests received through the first communications component from the head unit corresponds to a service on the specified list of services, may forward such one or more requests received to the server-based network through the second communications component. The peer communications control component may monitor types of and patterns of the requests received through the data transport connection and cache on the at least one processor-readable storage medium of the system at least a portion of a response received from the server-based network based upon the types of and patterns of the requests received. The serial data transport link may be either a Bluetooth® type or Universal Serial Bus (USB) type serial data transport link.

An article of manufacture may be summarized as including: a processor-readable storage medium having processor-executable instructions stored thereon for: providing communications between a head unit of an automobile, a communications device having a handheld form factor, and a server-based network through which Internet access may be provided, the providing communications comprising: receiving one or more requests via a peer-to-peer network stack by the communications device from the head unit over a serial data transport link between the head unit and the communications device; and performing a service specified in the one or more requests in response to the one or more requests comprising: forwarding a request to a server-based network from the communications device via a general network stack separate from the peer-to-peer network stack; receiving a response from the server-based network via the general network stack; and forwarding at least a portion of the response to the head unit over the serial data transport link.

The communications device and the head unit may each have a network address to use over the serial data transport link and the performing the service may occur irrespective of whether a network packet containing the one or more requests sent over the serial data transport link from the head unit includes the network address of the communications device as a destination network address. The providing communications may further comprise configuring a user interface of the head unit to visually match a corresponding user interface of the communications device by communicating information over the serial data transport link from the communications device to the head unit, said information containing data adapted for use by the head unit to configure the user interface of the head unit to visually match the corresponding user interface of the communications device. Information included in the at least a portion of the response forwarded to the head unit may be for display on the user interface of the head unit configured to visually match the corresponding user interface of the communications device. The article of manufacture may have further processor-executable instructions stored thereon for: receiving at least one additional request via the peer-to-peer network stack by the communications device from the head unit over a serial data transport link; determining whether the at least one additional request corresponds to a service on a specified list of services; and in response to determining that the at least one additional request corresponds to a service on the specified list of services, forwarding the at least one additional request to the server-based network from the communications device via the general network. The article of manufacture may have further processor-executable instructions stored thereon for: caching at least a portion of the response on the communications device based upon previous monitoring on the server-based network types of and patterns of the received one or more requests. The serial data transport link between the head unit and the communications device may be either a Bluetooth® Serial Port Profile (SPP) type serial data transport link or Universal Serial Bus (USB) type serial data transport link.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 9 is a flow diagram showing a method for communicating in a communication network environment between a first and a second network peer over a direct serial data transport including handling the communications received which have requests for particular network services, according to one illustrated embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, databases, communications devices, and communications networks have not been shown or described in detail to avoid unnecessarily obscuring descriptions of the embodiments.

Unless the context requires otherwise, throughout the specification and claims which follow, the word "comprise" and variations thereof, such as "comprises" and "comprising", are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, meaning "and/or" unless the content clearly dictates otherwise.

The headings and Abstract of the Disclosure provided herein are for convenience only and do not interpret the scope or meaning of the embodiments.

Figure 1:
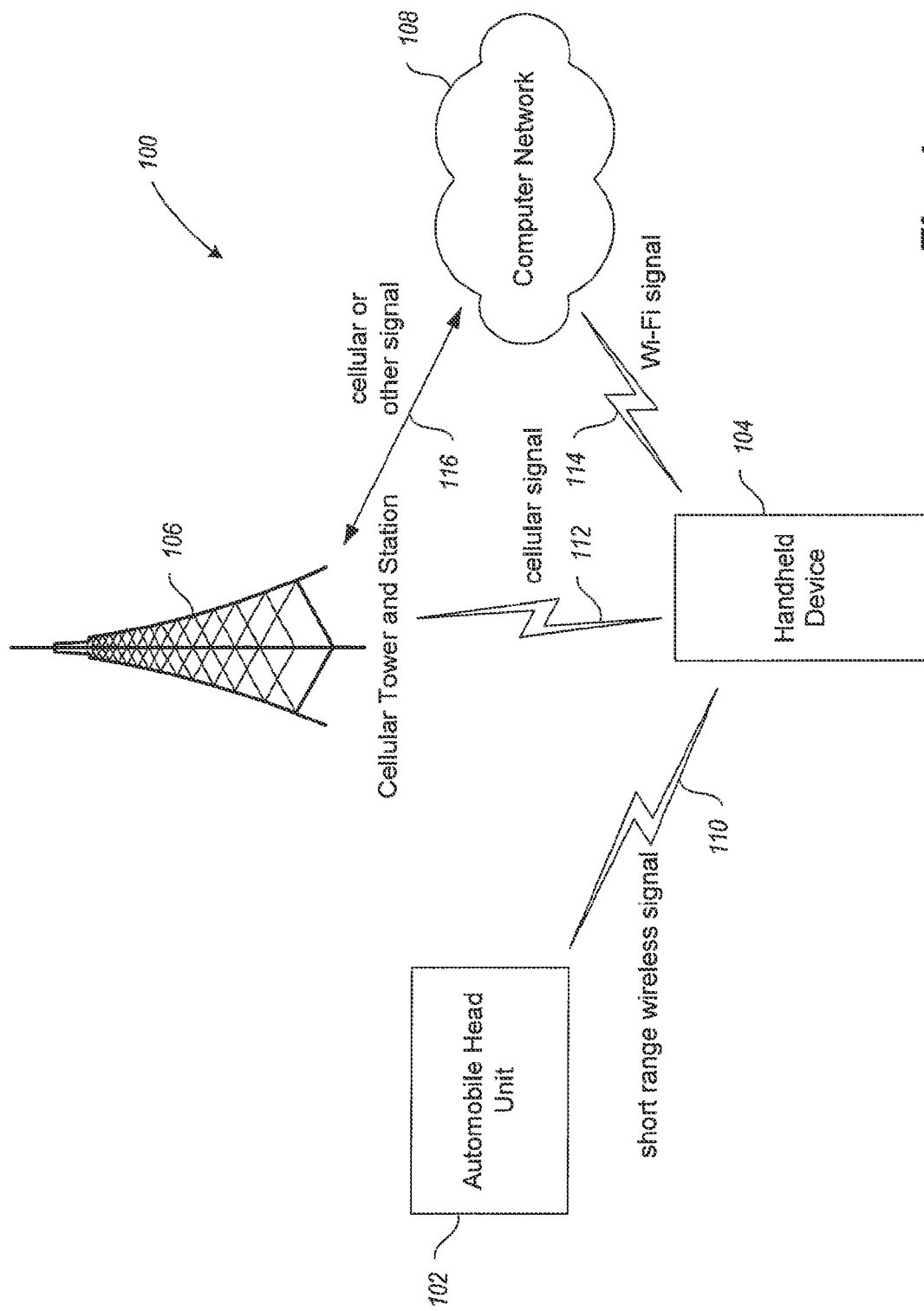
FIG. 1 is a system diagram of a networked environment according to one illustrated embodiment, the networked environment including an automobile head unit, a handheld communications device, a cellular tower and station, and a computer network, the automobile head unit and handheld communications device communicatively linked by a short range wireless signal, the handheld communications device and cellular tower and station communicatively linked by a cellular signal, the handheld communications device and computer network optionally linked by one or more communications networks (e.g., using Wi-Fi signal), and the cellular tower and station and computer network communicatively linked by one or more communications networks (e.g., using a cellular or other signal).

FIG. 1 shows a networked environment 100 according to one illustrated embodiment. The networked environment may include an automobile head unit 102, a communications device having a handheld form factor (i.e., handheld communications device) 104, a cellular tower and station 106, and a computer network 108. The automobile head unit 102 may be any component of an automobile or vehicle configured to process or communicate information to a driver, passenger or other component of the automobile, or to control other components that process or communicate information to a driver, passenger or other component of the automobile. For example, the automobile head unit 102 may have computer processing, communications and data storage capabilities that are implemented by a combination of one or more embedded processing, memory and communications units or modules of the automobile head unit 102. Many automobile head units are typically a part of or control an automobile's in-dash stereo, navigation and/or other entertainment or driver information system.

The handheld communications device can take the form of any of a large variety of mobile communications and/or processing devices having a handheld form factor. Examples of such may include cellular phones, personal digital assistants or PDAs (e.g., Blackberry® devices, iPhone® devices, Palm Pre® devices, Android® devices), cellular enabled laptop computers, netbook computers and tablet devices (e.g., IPAD® device).

The automobile head unit 102 and handheld communications device 104 may be communicatively linked by a short range wireless signal 100. For example, this short range wireless signal may be that of a wireless Bluetooth® link. However, other wireless or wired connections that support serial or parallel data transport may also be used. The link between the automobile head unit 102 and handheld communications device 104 may be automatically established when the handheld communications device 104 comes into the vicinity of the automobile head unit 102 according to various protocols and/or standards of the applicable type of short range wireless link. The connectivity over the short range wireless signal 110 may be enabled by the automobile head unit 102 and/or the handheld communications device 104 having the applicable hardware and software that provides the particular short-range wireless capability. For example, the automobile head unit 102 and handheld communications device 104 may both have wireless transmitters and receivers and, in the case of using a Bluetooth® wireless link, the corresponding executable Bluetooth® compatible network communications software that initiates, controls, maintains and manages the wireless link between the automobile head unit 102 and the handheld communications device 104 over the short range wireless signal 110.

The handheld communications device 104 and cellular tower and station 106 may be communicatively linked by a wireless cellular signal 112 supporting mobile telecommunications. For example, the mobile telecommunications may be various digital mobile telecommunications including those according to the International Mobile Telecommunications-2000 (IMT-2000), better known as the 3rd Generation (3G), family of standards for mobile telecommunications fulfilling specifications by the International Telecommunication Union. The handheld communications device 104 and computer network 108 may be optionally linked by one or more communication links or networks. For example, the communications network may be a local area network that uses wireless fidelity (Wi-Fi) high frequency radio signals 114 to transmit and receive data over distances of a few hundred feet. The local area network may be a wireless local area network (WLAN) based on the Institute of Electric and Electronic Engineers (IEEE) 802.11 standards. However, other wired and wireless communications networks and protocols may be used to link the handheld communications device 104 to the computer network 108. Thus, the handheld communications device 104 may have applicable wireless transmitters and receivers and, in the case of using a Wi-Fi wireless link, the corresponding executable Wi-Fi compatible network communications software that initiates, controls, maintains or manages the wireless link between the computer network 108 and the handheld communications device 104 over the Wi-Fi signal 114.

The computer network 108 may comprise other computing entities that provide services to the handheld communications device 104 (i.e., a server-based network), and may itself represent multiple interconnected networks. For instance wired and wireless enterprise-wide computer networks, intranets, extranets, and/or the Internet may be included in or comprise a part of computer network 108. Other embodiments may include other types of communication networks including other telecommunications networks, cellular networks, paging networks, and other mobile networks. There may be any variety of computers, switching devices, routers, bridges, firewalls, edge devices and other devices within computer network 108 and/or in the communications paths between the handheld communications device 104, the cellular tower and station 106 and the computer network 108. In accordance with an aspect of the disclosure, the handheld communications device 104 may contain discrete functional program modules that might make use of an application programming interface (API), or other object, software, firmware and/or hardware, to request services of one or more of the other entities within the computer network 108. Although the physical environment of the computer network 108 may have connected devices such as computers, the physical environment may alternatively have or be described comprising various digital devices such as personal digital assistants (PDAs), televisions, MP3 players, etc., software objects such as interfaces, Component Object Model (COM) objects and the like.

There are a variety of systems, components, and network configurations that may also support distributed computing environments within the computer network 108. For example, computing systems may be connected to the together within the computer network 108 by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with, be connected to, or comprise part of the computer network 108.

Figure 2:
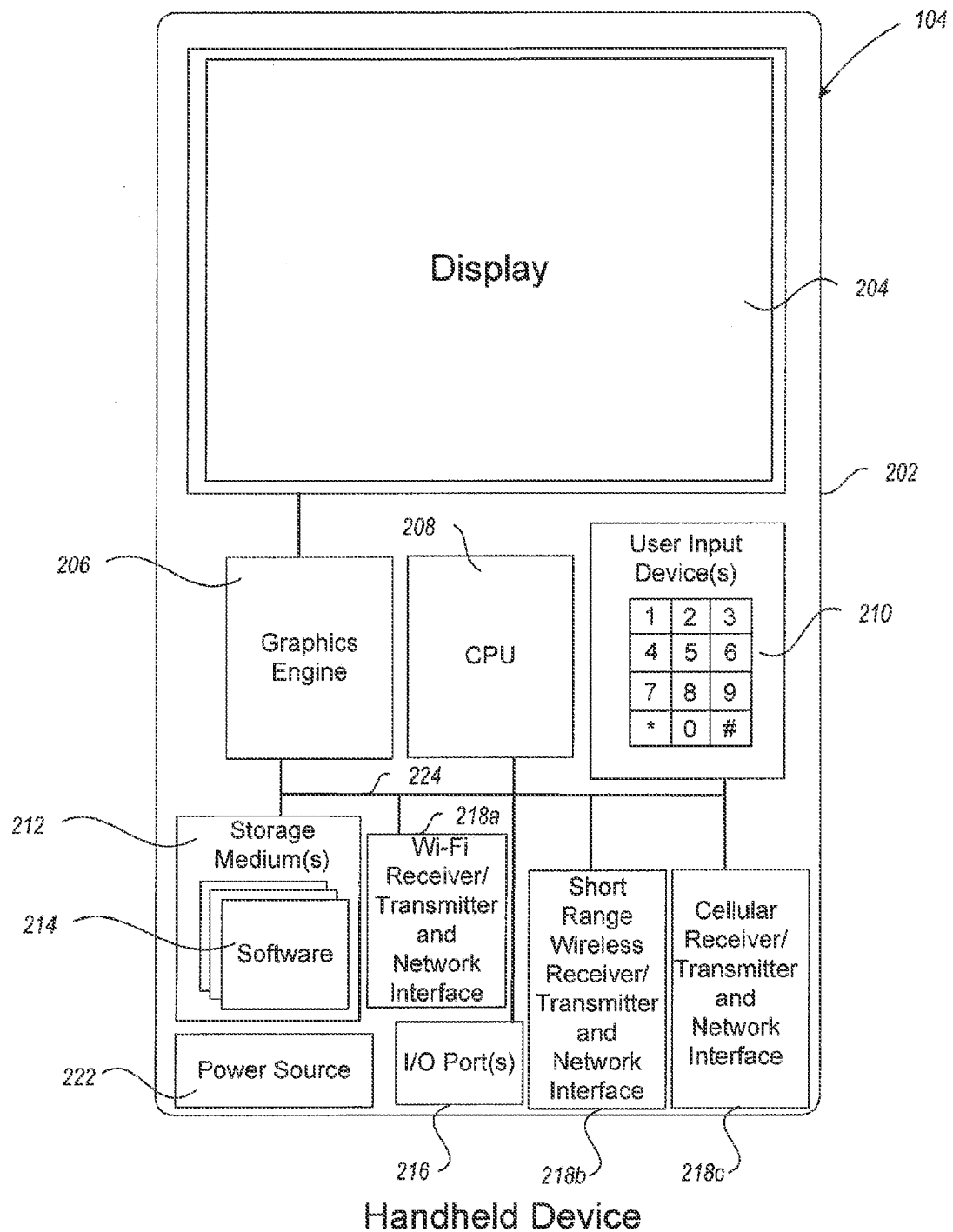
FIG. 2 is a schematic view of the handheld communications device shown in more detail according to one illustrated embodiment, the handheld communications device having a housing, a display, a graphics engine, a central processing unit (CPU), user input device(s), one or more storage mediums having various software modules thereon that are executable by the CPU, input/output (I/O) port(s), network interface(s), wireless receiver(s) and transmitter(s), and a power source.

The network infrastructure such as that shown FIG. 1 may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, executed by hardware that requests a service provided by another program. Generally, the client process utilizes the requested service without having to "know" any working details about the other program or the service itself. In a client/server architecture, particularly a networked system, a client is usually a computer or device that accesses shared network resources provided by another computer, e.g., a server. In the example of FIG. 2, any entity including the automobile head unit 102, handheld communications device 104, cellular tower and station 106, and entities within computer network 108, can be considered a client, a server, or both, depending on the circumstances.

A server is typically, though not necessarily, a remote computer system accessible over a remote network, such as the Internet, or local network. The client process may be active in a first computer system or device, and the server process may be active in a second computer system or device, communicating with one another over a communications medium, thus providing distributed functionality and allowing single or multiple clients to take advantage of the information-gathering capabilities of the server. Any software objects may be distributed across multiple computing devices or objects. Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) which may be a component of a Universal Resource Locator (URL) can be used to identify the server or client computers to each other. Communication can be provided over a communications medium, e.g., client(s) and server(s) may be coupled to one another via transmission control protocol/internet protocol (TCP/IP) connection(s) for high-capacity communication. For example, the cellular tower and station 106 and computer network 108 may be communicatively linked by one or more communications networks or communication mediums (e.g., using a cellular or other wired or wireless signal 116) in order to send and receive information to and from the computer network 108 and receive and provide such information from and to the handheld communications device 104 over a wireless signal on the cellular network using applicable combinations and layers of telecommunications and networking protocols and standards such as 3G, HTTP and TCP/IP, etc.

FIG. 2 shows an exemplary handheld communications device 104 shown in more detail according to one illustrated embodiment. The handheld communications device 104 may have a housing 202, a display 204, a graphics engine 206, a central processing unit (CPU) 208, one or more user input devices 210, one or more storage mediums 212 having various software modules stored thereon comprising instructions that are executable by the CPU 208, input/output (I/O) port(s) 216, a Wi-Fi receiver/transmitter and network interface 218a, a short range wireless receiver/transmitter and network interface 218b, a cellular receiver/transmitter and network interface 218c, and a power source 222.

As previously noted, the handheld communications device 104 may be any of a large variety of communications devices such as a cellular telephone, a portable media player (PMP), a personal digital assistant (PDA), a mobile communications device, portable computer with built-in or add-on cellular communications, a portable game console, a global positioning system (GPS), a handheld industrial electronic device, or the like, or any combination thereof. The handheld communications device 104 has at least one central processing unit (CPU) 206 which may be a scalar processor, a digital signal processor (DSP), a reduced instruction set (RISC) processor, or any other suitable processor. The central processing unit (CPU) 208, display 204, graphics engine 206, one or more user input devices 210, one or more storage mediums 212, input/output (I/O) port(s) 216, Wi-Fi receiver/transmitter and network interface 218a, short range wireless receiver/transmitter and network interface 218b, and cellular receiver/transmitter and network interface 218c may all be communicatively connected to each other via a system bus 224. The system bus 224 can employ any suitable bus structures or architectures, including a memory bus with memory controller, a peripheral bus, and/or a local bus.

The handheld communications device 104 also includes one or more volatile and/or non-volatile storage medium(s) 212. The storage mediums 212 may be comprised of any single or suitable combination of various types of processor-readable storage media and may store instructions and data acted on by CPU 208. For example, a particular collection of software instructions comprising software 214 and/or firmware instructions comprising firmware are executed by CPU 208. The software or firmware instructions generally control many of the operations of the handheld communications device 104 and a subset of the software and/or firmware instructions may perform functions to operatively configure hardware and other software in the handheld communications device 104 to provide the initiation, control and maintenance of applicable computer network and telecommunication links from the handheld communications device 104 to the external automobile head unit 102, cellular tower and station 106 and external computer network 108 as shown in FIG. 1 via the Wi-Fi receiver/transmitter and network interface 218a, short range wireless receiver/transmitter and network interface 218b, cellular receiver/transmitter and network interface 218c, and/or I/O ports shown in FIG. 2.

By way of example, and not limitation, the storage medium(s) 212 may be processor-readable storage media which may comprise any combination of computer storage media including volatile and nonvolatile, removable and non-removable media implemented in any method or technology for storage of information such as computer readable instructions, data structures, program modules or other data. Processor-readable storage media includes, but is not limited to, random access memory (RAM), read only memory (ROM), electrically erasable programmable read only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may accessed by CPU 208. Combinations of any of the above should also be included within the scope of processor-readable storage media.

The storage medium(s) 212 may include system memory which includes computer storage media in the form of volatile and/or nonvolatile memory such as read only memory (ROM) and random access memory (RAM). A basic input/output system (BIOS), containing the basic routines that help to transfer information between elements within handheld communications device 104, such as during start-up or power-on, is typically stored in ROM. RAM typically contains data and/or program modules that are immediately accessible to and/or presently being operated on by CPU 208. By way of example, and not limitation, FIG. 2 illustrates software modules 214 including an operating system, application programs and other program modules that implement the processes and methods described herein.

The handheld communications device 104 may also include other removable/non-removable, volatile/nonvolatile computer storage media drives. By way of example only, the storage medium(s) 212 may include a hard disk drive or solid state storage drive that reads from or writes to non-removable, nonvolatile media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in an operating environment of the handheld communications device 104 include, but are not limited to, flash memory cards, digital versatile disks, micro-discs, digital video tape, solid state RAM, solid state ROM, and the like. The storage medium(s) are typically connected to the system bus 224 through a non-removable memory interface. The storage medium(s) 212 discussed above and illustrated in FIG. 2, provide storage of computer readable instructions, data structures, program modules and other data for the handheld communications device 104. In FIG. 2, for example, a storage medium may store software 214 including an operating system, application programs, other program modules, and program data. The storage medium(s) 212 may implement a file system, a flat memory architecture, a database, or any other method or combination capable for storing such information.

A user may enter commands and information into the handheld communications device 104 through touch screen display 204 or the one or more input device(s) 210 such as a keypad, keyboard, camera, motion sensor, position sensor, light sensor, biometric data sensor, accelerometer, or a pointing device, commonly referred to as a mouse, trackball or touch pad. Other input devices of the handheld communications device 104 may include a microphone, joystick, game pad, optical scanner, other sensors, or the like. Example use of the input devices, in particular the microphone, is described in greater detail below in conjunction with communications to external servers. These and other input devices are often connected to the CPU 208 through a user input interface that is coupled to the system bus 224, but may be connected by other interface and bus structures, such as a parallel port, serial port, wireless port, game port or a universal serial bus (USB). Generally, a unique software driver stored in software 214 configures each input mechanism to sense user input, and then the software driver provides data points that are acted on by CPU 208 under the direction of other software 214. The display is also connected to the system bus 224 via an interface, such as the graphics engine 206. In addition to the display 204, the handheld communications device 104 may also include other peripheral output devices such as speakers, a printer, a projector, an external monitor, etc., which may be connected through one or more analog or digital I/O ports 216 or network interfaces of the Wi-Fi receiver/transmitter and network interface 218*a*, short range wireless receiver/transmitter and network interface 218*b* or cellular receiver/transmitter and network interface 218*c*.

The handheld communications device 104 may operate in a networked environment using connections to one or more remote computers or devices, such as a remote computer or device within the computer network 108, the cellular tower and station 106, and the automobile head unit 102 shown in FIG. 1 and described above. The remote computer within computer network 108 may be a personal computer, a server, a router, a network PC, a peer device or other common network node, and typically includes many or all of the elements described above relative to the handheld communications device 104. Such connections to the computer network 108 may include local area network (LAN) connections as described above or wide area network (WAN) connections, and/or other networks.

When used in a LAN or WAN networking environment, the handheld communications device 104 may be connected via the Wi-Fi receiver/transmitter and network interface 218*a* and/or the cellular receiver/transmitter and network interface. When used in a WAN networking environment, the handheld communications device 104 may include a modem or other means as part of the network interface(s) for establishing communications over the WAN, such as the Internet. The Wi-Fi receiver/transmitter and network interface 218*a* and/or the cellular receiver/transmitter and network interface may be communicatively connected to the system bus 224. In a networked environment, program modules depicted relative to the handheld communications device 104, or portions thereof, may be stored in a remote memory storage device of a remote system.

The handheld communications device 104 has a collection of I/O ports 216 and/or short Range wireless receiver/transmitter and network interfaces 218*a* for passing data over short distances to and from the handheld communications device 104 or for coupling additional storage to the handheld communications device 104. For example, serial ports, USB ports, Wi-Fi ports, Bluetooth® ports, IEEE 1394 (i.e., FireWire), and the like can communicatively couple the handheld communications device 104 to other computing apparatuses. Compact Flash (CF) ports, Secure Digital (SD) ports, and the like can couple a memory device to the handheld communications device 104 for reading and writing by the CPU 208 or couple the handheld communications device 104 to other communications interfaces such as Wi-Fi or Bluetooth transmitters/receivers and/or network interfaces.

Handheld communications device 104 also has a power source 222 (e.g., a battery). The power source 222 may supply energy for all the components of the handheld communications device 104 that require power when a traditional, wired power source is unavailable or otherwise not connected. Other various suitable system architectures and designs of the handheld communications device 104 are contemplated and may be utilized which provide the same, similar or equivalent functionality as those described herein.

It should be understood that the various techniques described herein may be implemented in connection with hardware, software and/or firmware or, where appropriate, with a combination of such. Thus, the methods and apparatus of the disclosure, or certain aspects or portions thereof, may take the form of program code (i.e., instructions) embodied in tangible media, such as floppy diskettes, CD-ROMs, hard drives, or any other machine-readable or processor-readable storage medium wherein, when the program code is loaded into and executed by a machine, such as a processor of a computer or handheld communications device, the machine becomes an apparatus for practicing various embodiments. In the case of program code execution on programmable computers or handheld communications devices, such generally includes a processor, a storage medium readable by the processor (including volatile and non-volatile memory and/or storage elements), at least one input device, and at least one output device. One or more programs may implement or utilize the processes described in connection with the disclosure, e.g., through the use of an API, reusable controls, or the like. Such programs are preferably implemented in a high level procedural or object oriented programming language to communicate with a computer system including the computer system depicted in FIG. 2 of handheld communications device 104. However, the program(s) can be implemented in assembly or machine language, if desired. In any case, the language may be a compiled or interpreted language, and combined with hardware implementations.

Figure 3:
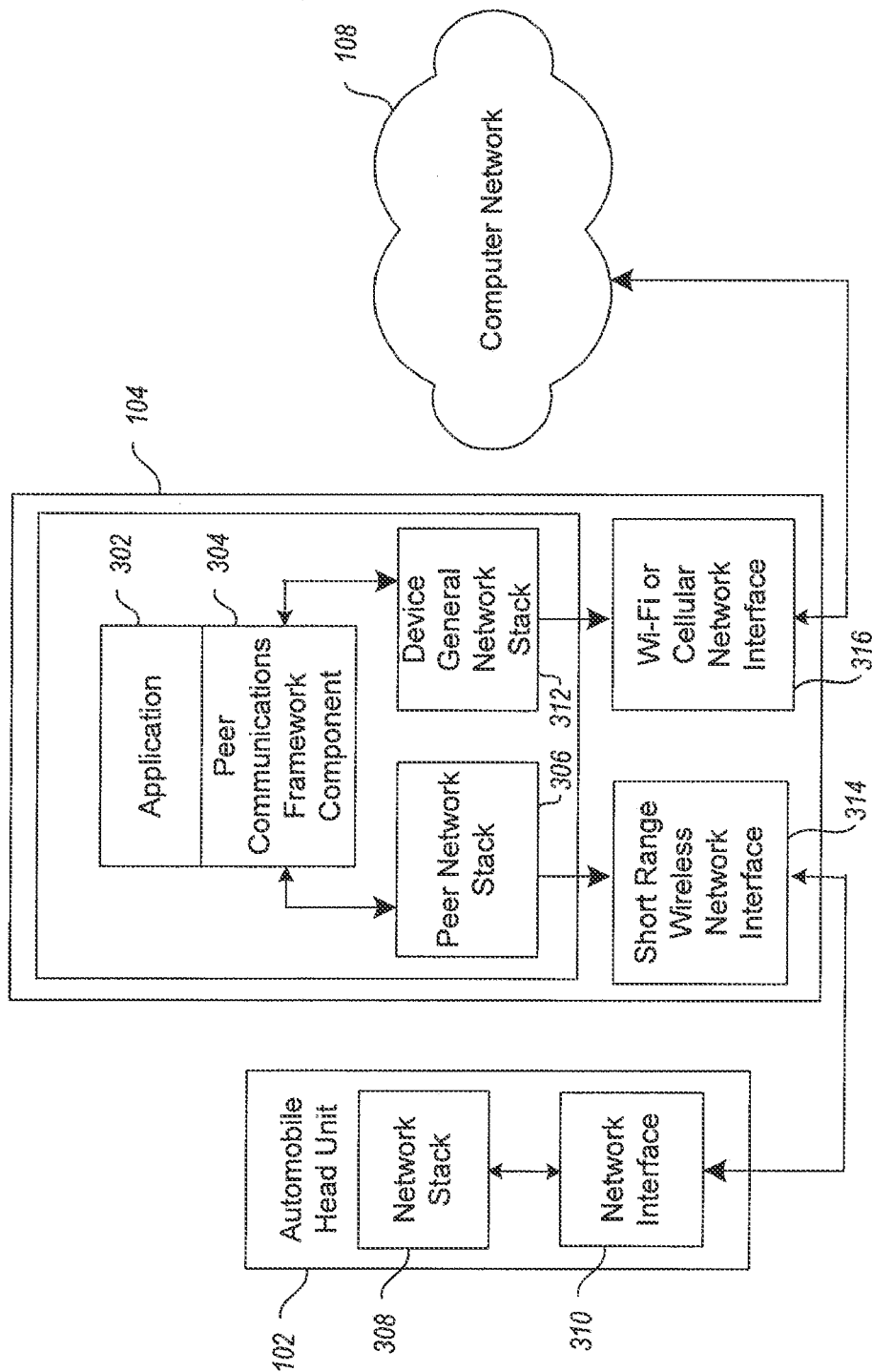
FIG. 3 is a schematic diagram, according to one illustrated embodiment, showing software modules of the handheld communications device in more detail including an application, a peer communications framework component, a network stack of the handheld communications device interconnected with a network stack of the automobile head unit, and another network stack of the handheld communications device interconnected to another computer network.

FIG. 3 shows software modules of the handheld communications device 104 in more detail according to one illustrated embodiment. The software modules include an application 302, a peer communications framework component 304, a network stack of the handheld communications device 104 such as a peer-to-peer (i.e., peer) network stack 306 preferably wirelessly interconnected with a network stack 308 of the automobile head unit 102 via a network interface 310 of the automobile head unit 102, and another network stack such as a device general network stack 312 of the handheld communications device 104 interconnected to the computer network 108.

A network stack (i.e., a protocol stack or communications stack) is a particular software implementation of a group of layered computer networking protocols. Example descriptions of layered communications and computer network protocol design and particular TCP/IP network protocols provided herein are available in the Wikipedia.com articles "OSI Model" found at http://en.wikipedia.org/wiki/OSI_Reference_Model and "TCP/IP Model" found at http://en.wikipedia.org/wiki/TCP/IP_model, which are both hereby incorporated by reference in their entirety and Request for Comments (RFC) 1122 and RFC 1123 available at http://tools.ietf.org/html/rfc1122 and http://tools.ietf.org/html/rfc1123, respectively, published by the Internet Engineering Task Force (IETF) and both also hereby incorporated by reference in their entirety. The network stack is the software implementation of a group of layered protocols. Because each protocol module usually communicates with two others, they are often referred to as layers in a stack of protocols. The lowest protocol deals with "low-level", physical interaction of the hardware. Every higher layer adds more features. User and other specific applications usually communicate with the topmost layers. Network stacks are often divided into three major sections: media, transport, and applications. A particular operating system or platform will often have two well-defined software interfaces: one between the media and transport layers, and one between the transport layers and applications. The media-to-transport interface defines how transport protocol software makes use of particular media and hardware types. For example, the media-to-transport interface level would define how TCP/IP transport software would communicate with Ethernet hardware. The application-to-transport interface defines how application programs make use of the transport layers. For example, the application-to-transport interface level would define how a Web browser program would communicate with TCP/IP transport software. In the present example, the peer communications framework component 304 may have one or more sub-modules or routines operating at or communicating with various layers of the peer network stack 306 and general network stack 312. The structure of the example peer-to-peer network stack is shown in further detail in FIG. 3.

The application 302 may interface with the peer communications framework component 304 through an application programming interface (API) and may work as middleware, with a separate connection to both the computer network 108 (e.g., the Internet) and to an external device, such as the automobile head unit 102. The peer network stack 306 and the general stack 312 may be communicatively connected to the automobile head unit 102 and the computer network 108, respectively, via a separate physical or logical short range wireless network Interface 314 (e.g., a Bluetooth® interface) and a Wi-Fi or cellular network interface 316 in communication with one or more lower layers of the peer network stack 306 and general network stack 312. The peer network stack 306 and automobile head unit 102 network stack provide a peer-to-peer network connection between the automobile head unit 102 and handheld communications device 104. A peer-to-peer (P2P) connection is a connection between two devices to share resources without going through a separate server computer between them. In particular, the peer-to-peer connection of FIG. 3 consists of a connection between two devices consisting of the handheld communications device 104 and the automobile head unit 102. There are no other intervening devices or nodes on the peer-to-peer network between the handheld communications device 104 and the automobile head unit 102.

Although the handheld communications device 104 may have a separate connection out to the Internet via the general network 312 stack co-existing on the same handheld communications device 104, the peer network stack 306 and the general stack 312 are not directly connected. For example, an HTTP request from the external device (e.g., the automobile head unit 102) to the handheld communications device 104 is not merely forwarded out to the Internet, but rather is handled by the peer communications framework component 304 and by the application 302 using it. The peer communications framework component 304 may service the request in many different ways including, but not limited to returning a file cached on the handheld communications device 104, returning data generated at runtime based on the request, proxying out to the Internet via the general network stack 312 and forwarding/caching the results as needed to the automobile head unit 102. These operations are enabled by the peer communications framework component 304 and its associated application 302 being connected to both the peer network stack 306 and the general stack 312. Thus, the system of the handheld communications device 104 does not merely act as a general proxy, but rather as a service provider with multiple functions.

The peer network stack 306 and automobile head unit 102 network stack may provide a peer-to-peer network connection on a serial data transport link between the automobile head unit 102 and handheld communications device 104. As shown in FIG. 1, the automobile head unit 102 and handheld communications device 104 may be communicatively linked by a short range wireless signal 100. For example, this short range wireless signal may be that of a wireless Bluetooth® or a wired Universal Serial Bus (USB) link. However, other wireless or wired connections that support serial or parallel data transport may also be used. The link between the automobile head unit 102 and handheld communications device 104 may be automatically established when the handheld communications device 104 comes into the vicinity of the automobile head unit 102 according to various protocols and/or standards of the applicable type of short range wireless link.

The peer-to-peer network connection is relatively secure. It may be specified to be a connection between only two devices using a secure data transport link at the physical layer of the peer network stack 306. Bluetooth® supports automatically and transparently encrypting the data flows and this functionality may be relied upon in particular embodiments using Bluetooth® Serial Port Profile (SPP) as the transport mechanism at the physical layer of the peer network stack 306. In particular embodiments using a wired USB link in the transport mechanism, the connection would be difficult to tap without physically altering the hardware. To add to this security, certain services may require HTTP digest authentication.

The handheld communications device 104 may have particular network services available natively at the handheld communications device 104 and others that are not available natively at the handheld communications device 104. The peer communications framework component 304 may handle the communications from the automobile head unit 102 such that the handling the communications received from the automobile head unit 102 via the peer-to-peer connection enables the automobile head unit 102 to handle network communications in a same manner irrespective of whether the one or more particular network services are available at all to the automobile head unit 102 via the handheld communications device 104. For example, both the peer network stack 306 and the automobile head unit 102 network stack 308 may provide a minimal HTTP or HTTPS server and both may be able to make HTTP or HTTPS requests to the other device. The peer network stack 306 in conjunction with the peer communications framework component 304 may provide a superset of that minimal support, including, but not limited to: an HTTP or HTTPS server that provides various services available over the peer-to-peer network between the automobile head unit 102 and handheld communications device 104 natively at the handheld communications device 104, the ability to pass other service requests to the application 302 for processing, and the ability to make HTTP requests to the automobile head unit 102. However, the automobile head unit 102 need not communicate differently with the handheld communications device 104 if particular network services are not available at or via the handheld communications device 104 over the peer-to-peer connection as the corresponding response from the handheld communications device 104 will handle such requests in an appropriate manner according to the particular network protocol (e.g., TCP/IP) to enable further communications between the automobile head unit 102 and the handheld communications device 104 without interrupting the connection. For example, if the handheld communications device 104 does not provide services such as Dynamic Host Configuration Protocol (DHCP) or Address Resolution Protocol (ARP), requests for such services will be ignored or otherwise responded to in a manner enabling the requester to continue communications in a normal manner without interrupting the current network connection or session. Thus, the automobile head unit 102 requires no "knowledge" of whether particular network services are supported or provided by the handheld communications device 104 beyond a minimal set of network services.

In one example embodiment, each device (e.g., the automobile head unit 102 and handheld communications device 104) in the peer-to-peer connection has a specific role. In the present example, the handheld communications device 104 acts as a Bluetooth® server and as the "anchor" of the connection. It uses a specified IP address, for example, "168.100.10.1". The external device (e.g., the automobile head unit 102) acts as an external device without a connection to the server-based computer network 108 (in this case, the Internet). It uses a different specified IP address, for example, "168.100.10.2". However, in a scenario where there exists only two peers on the peer-to-peer connection (e.g., the automobile head unit 102 and handheld communications device 104), the destination network address of communications between the two peers may be ignored as it may be assumed that the intended destination is the network peer other than the one which sent the communication. The handheld communications device 104 or "anchor" device has a connection out to the server-based system computer network 108 (e.g., the general Internet), which it uses to retrieve files for caching and for other purposes appropriate to the application 302. It also controls the peer connection process with the external device (e.g., the automobile head unit 102). The external device does not require an Internet connection and will use its "anchor" peer (e.g., the handheld communications device 104) to get files and perform services. It may expect to act as the client in the peer connection process.

Services are provided between the handheld communications device 104 and the automobile head unit 102 via the peer network stack 306 and the automobile head unit 102 network stack 308 by HTTP GET and POST requests where the service name is the file/path name portion of the URL. These services may use normal HTTP semantics and headers and provide the data using standard Multipurpose Internet Mail Extensions (MIME) types. The handheld communications device 104 may provide the HTTP server on port 80. Thus, a request to the handheld communications device handheld communications device handheld communications device 104 may look like "http://168.100.10.1:80/servicename?foo=bar". The external device (e.g., the automobile head unit 102) provides the HTTP server on port 8080. Thus, a request to the external device may look like "http://168.100.10.1:8080/servicename?foo=bar". Depending on the service requested, the data returned may be retrieved from a locally cached file, generated at runtime, or requested on a separate network connection and forwarded to the peer or cached locally for the next request. For example, voice can be processed locally on the handheld communications device 104 or sent to a server for processing. If sent to a server, the results of voice processing can be returned handheld communications device 104 as a parse tree, a list of 1 to N possible matches, an error, or even set to yet another server for processing into code telling the handheld communications device 104 what to do next. For example the server could form a query to another second server that appears to the second server like the results of haptic (touch/keyboard) input and the second server could respond in exactly the same way as if the original input had been haptic on the handheld communications device 104. The voice processing server could then forward those results back to the handheld communications device 104.

Services may be provided by the associated application 302, using API calls to the peer communications framework component 304. Certain services are native to the peer communications framework component and can operate without application intervention. Such services include (but are not limited to) service discovery (which lists available services), file retrieval (which provides files from the cache, with aliasing, and supports cache modification), and controlled Internet proxy (which forwards requests to preselected Internet servers, with aliasing).

Discoverability of available services is provided by a specific service that is provided by at least one peer (e.g., the handheld communications device 104 or the automobile head unit 102). In the present example, this would be the handheld communications device 104 (the "anchor" device) and the discoverability service is available natively at the peer communications framework component 304. In one embodiment, this service may return a specified Extensible Markup Language (XML) file describing the available services. For example, the URL of the file may be "http://168.100.10.1:80/servicelist". The service list contains enough information for the external device (e.g., the automobile head unit 102) to create menus of available services and to access the available services to obtain more information as needed. In most cases each peer (e.g., the automobile head unit 102 and the handheld communications device 104) will request the service list from the other. The details of the service list may be specified with configuration data supplied to the peer communications framework component 304 on initialization. This configuration may be provided by the application 302 or maintained on the computer network 108 (e.g., the Internet). In the latter case, the configuration will be downloaded by the application 302 on startup of the handheld communications device 104, allowing the available services of the handheld communications device 104 to change over time without refreshing the application 302. The handheld communications device 104 may determine whether a request from the automobile head unit 102 corresponds to a service in a file describing the available services. The handheld communications device 104 may then forward the request to the server-based computer network 108 if it was determined that the request corresponds to a service in the file describing the available services.

Also, information may be communicated from the handheld communications device 104 (the "anchor" device) to configure a user interface of the external device (e.g., the automobile head unit 102) to visually match a corresponding user interface of the handheld communications device 104 by communicating information over the serial data transport link from the handheld communications device 104 to the automobile head unit 102. Also, information may be communicated from the handheld communications device 104 (the "anchor" device) to configure or provide other information to the external device. The information may contain data adapted for use by the automobile head unit 102 to configure the user interface of the automobile head unit 102 to visually match the corresponding user interface of the handheld communications device 104. The information may contain data adapted for use by the automobile head unit 102 to configure other components or applications of the automobile head unit 102. In one example, the information included in the data returned to the automobile head unit 102 may be for display on the user interface of the automobile head unit 102 that is configured to visually match the corresponding user interface of the handheld communications device handheld communications device handheld communications device 104. The information may also be obtained from and configured on a remote server on the server-based computer network 108 and be configured such that a user interface of the handheld communications device 104, automobile head unit 102 and one or more remote devices on the server-based computer network 108 substantially match each other.

As the handheld communications device 104 may in some instances not always be connected to the computer network 108, but preferably still be capable of providing services to the external device (e.g., the automobile head unit 102), the peer communications framework component 304 may provide intelligent file caching and pre-loading to increase the chances that data will be available when requested. The peer communications framework component 304 may monitor types of and patterns of requests received from the automobile head unit 102 and cache on one or memories of the handheld communications device 104 at least a portion of a response received from the server-based computer network 108 based upon the types of and patterns of the requests received. Particular parts of the file caching service such as the monitoring of types of and patterns of requests received may be implemented on an Internet server, making the intelligence of the system more powerful and easy to extend. The actual management of the cache may occur on the client (e.g., the handheld communications device 104), where the capacity and capabilities of that device are known. For example, the peer communications framework component 304 may include a client that requests cache control data from a server on the server-based computer network 108, which specifies what files are to be cached along with metadata the client uses to control how the cache is managed. The client then attempts to load those files from the network 108 and store them locally on the handheld communications device 104, making them available for the peer communication control component and the local application 302. If a file is requested from the cache that has not yet been loaded on the handheld communications device 104 or that is not in the cache control data, that file may be immediately requested from the network 108 and cached before it is provided to the requester (e.g., the automobile head unit 102).

Either peer (e.g., the handheld communications device 104 or the automobile head unit 102), or both peers, in the peer-to-peer connection between the peers may run an application that uses an identical or similar peer communications framework component to communicate with the other peer. This application will control the connection process on the "anchor" peer. The "external" peer can also run an identical or similar peer communications framework component 304 or may act as a "non-anchor" peer. However, the peer communications framework component 304 may be designed to link to one application 302 on a device at a time or several applications. If there is a need for several co-operating applications on the handheld communications device 104 to use the peer communications framework component 304 at the same time, a "wrapper" application may be used which provides cross-task communications appropriate for the device.

On a device (like a head unit 102) which is connected to the peer communications framework component 304 but believes it is connected to a general framework, the network stack on the head unit 102 may be used by several applications at the same time without requiring any "wrapper".

The peer communications framework component 304 may be implemented and provided as a code library, in both C/C++ and Java™ versions, for multiple platforms. Depending on the platform the peer communications framework component 304 and associated modules and routines may be provided as source code and/or as a pre-compiled binary file that can be linked into the code of the particular application 302. In some embodiments, the binary file may be runtime linkable, allowing several applications to share a single peer communications framework component 304 library on the same device. Examples of versions in which the peer communications framework component 304 may be provided in runtime link form include, but are not limited to, Binary Runtime Environment for Wireless (BREW) as a BREW extension, and Java Mobile Information Device Profile (MIDP) as a Java Archive (JAR) file. Custom versions of the peer communications framework component 304 library can be provided, which may include only some of the peer communications framework component 304 modules. In an embodiment where a handheld communications device 104 can multi-task, the runtime linking described above may be used, and the peer communications framework component 304 may be implemented as a stand-alone application in order to implement this particular embodiment. In an embodiment where handheld communications device 104 cannot multi-task, the applications on the handheld communications device 104 may co-operate by shutting down and starting a different application when requested by the head unit 102. Such scenarios may involve shutting down and restarting the peer communications framework component 304 when the application changes.

Figure 4:
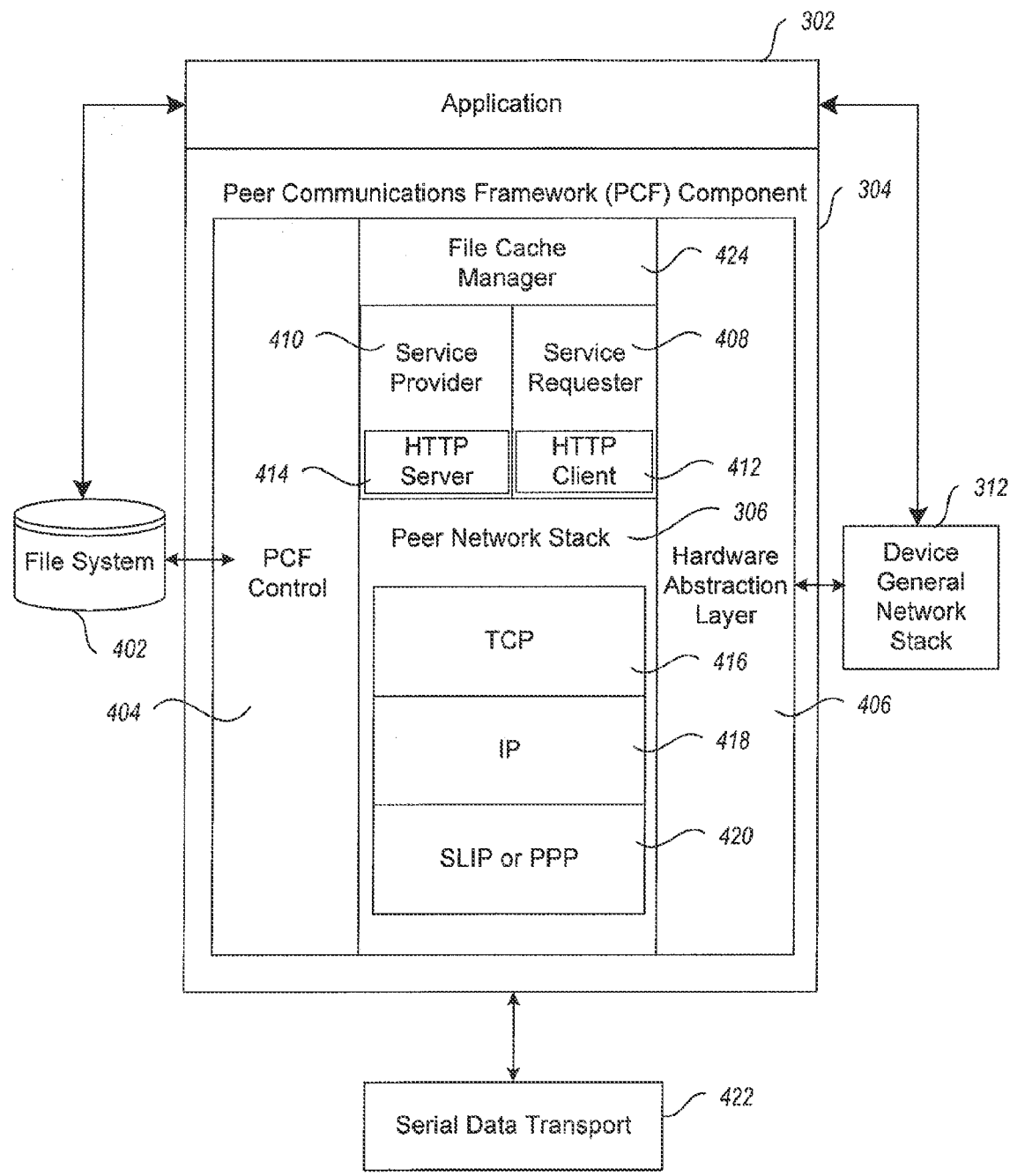
FIG. 4 is a schematic diagram showing, according to one illustrated embodiment, the peer communications framework component and the network stacks of the handheld communications device in greater detail including their logical connectivity to each other and a file system of the handheld communications device.

FIG. 4 is shows the peer communications framework component 304 and the network stacks 306 312 of the handheld communications device 104 in greater detail according to one illustrated embodiment, including their logical connectivity to each other and a file system 402 of the handheld communications device 104. Although the modules of FIG. 4 are described in the present example as being components of the "anchor" peer (e.g., the handheld communications device 104), such modules of the peer communications framework component 304 may also be present in the external device (e.g., the automobile head unit 102) such that it may also act as a service provider and requester and provide peer communications framework component 304 functionality.

The peer communications framework component 304 provides an integrated framework comprising of several components, each with their own APIs that an application 302 can use to control the peer communications framework component 304 and communicate with a peer device. These components are also leveraged within the peer communications framework control 404 to provide the basic services. The peer communications framework component 304 may have two components including, but not limited to, a control routine 404 and a hardware abstraction layer 406. The peer communications framework control 404 initializes the peer communications framework control 404, supplies global utilities, and provides a way to initiate and terminate peer connections. The peer communications framework control 404 and hardware abstraction layer 406 components operate at or communicate with various layers of the peer network stack 306, general network stack 312, and the service requester 408 and service provider 410 modules such that they may receive, process and send information in order to request and provide services, and control communications and operations of the device on which the peer communications framework component 304 is running. In particular, the hardware abstraction layer 406 isolates the peer communications framework component 304 code from the underlying device (e.g., the handheld communications device 104), by providing abstractions of the serial data transports (Bluetooth® SPP, USB, etc.), the device general network stack 312 functionality (cellular, Wi-Fi, etc.), and the device file system 402. These abstractions are then implemented for each local device, creating a unique port of the peer communications framework component 304 for that device. Alternative embodiments of the peer communications framework control 404 include peer network port objects with TCP and UDP support that the application 302 can use to implement protocols other than HTTP.

On application startup the application 302 may initialize and start the peer communications framework control 404, passing in the location of an appropriate configuration file. The peer communications framework control 404 configuration file may have an XML layout with sections for each of the major functional areas. An example XML layout appears below:

```
<peer communications framework control 404-config>
    <network-control>
        <data-transport name="TRANSPORT-NAME"
                role="anchor|floater">
            <info name="infoName">value</info>
        <data-transport>
        <ip-config ipaddr="IP-ADDRESS"servicePort="PORT-
                NUMBER"
            requestPort="PORT-NUMBER"/>
    </network-control>
    <service-control>
        <service name="serviceName" profile="profileName"
                type="app|file=filename|proxy=url|custom">
            <info name="infoName">value</info>
        </service>
    </service-control>
    <cache-control>
        <cache-clear>
            <clear-files pattern="filepattern???.*"/>
        </cache-clear>
        <cache-files>
            <file name="fileName" profile="profileName"
                url="http://some.domain/file.ext?foo=bar"
                refreshFlag="true|false" priority="0-N"
                estimatedSize="numbytes" />
        </cache-files>
    </cache-control>
```

In some embodiments, the peer communications framework control 404 does not define the meaning of service names, profile names, or the name/value pairs used to provide information to the containing tags. This is configurable by the particular implementation. For this reason, it may be desirable for network peers to namespace the particular service and info names of the network peer in a manner to avoid name collisions with other implementations and/or establish open naming standards which include detailed specifications for how a service works or a profile is used. Each peer is configured to know how to access the services and profiles it recognizes.

The network section of the configuration file defines how the network is initialized and the data transport over which the peer connection is made. The data transport configuration specified in the configuration file specifies the data transport to use, the role the device plays in the connection, and includes a set of name/value pairs that have meaning to that data transport. If the named transport is not available, the configuration is aborted and an error is returned to the application 302. The IP configuration specified in the configuration file specifies the IP address the device will use and what service ports on which it will receive requests and to which it will make requests. The services section of the configuration file provides a list of services a peer can perform and, optionally, lists of arbitrary name/value pairs attached to a service that have meaning in context with the service. For example, the name Services may be associated with a profile. Services have a type, which specifies how the peer communications framework control 404 handles a request to that service. In the present example, the following types are supported: app, file, proxy, and custom. Services may contain a list of name/value pairs associated with that service, the meanings of which are application dependent. For example, these name/value pairs could provide the information required to determine which arguments the service supports. The cache section of the configuration file indicates how to clear the cache on startup and provides a list of files to cache. Cached files may be associated with a profile. The proxy control section of the configuration file supports a set of "allow" and "deny" patterns defining which URLs are valid for remote proxy and file caching requests. For example, a valid URL must match at least one of the "allow" patterns and cannot match any of the "deny" patterns. The profiles section of the configuration file provides application dependent metadata about groups of items (e.g., services and files) which are associated with that profile. Profiles may contain a list of name/value pairs associated with that service, the meanings of which are application dependent. For example, these name/value pairs provide the information required to build a menu of the available services for an example profile named "weatherApp".

After the location of an appropriate configuration file is passed, the peer communications framework control 404 will then obtain a fresh copy of the configuration file (e.g., from a server on the Internet or from a local file system). The configuration file may be parsed and the appropriate configuration data is then supplied to the various components. When the application 302 requests, the peer communications framework control 404 will start looking for another peer using the data transport and device role defined in the configuration. When a connection is made, the peer communications framework control 404 will inform the application 302. If no connection is made, the peer communications framework control 404 will continue to search for a peer until told to stop. At any time after a connection is made, the application 302 can request the connection to be terminated. If the connection fails for any reason (e.g., normal termination, timeout, etc.) the application 302 will be informed.

The file cache manager component 424 handles downloading and caching of files from an external network such as computer network 108 (e.g., the Internet) supplying them to the application 302 and to the service provider 410 on request from a peer device (e.g., the automobile head unit 102). For example, the configuration file (e.g., an XML file) managed by the peer communications framework control 404 includes a cache control section that specifies what files to download and cache, along with metadata that determines how each file is handled. Using the applicable cache control XML from the configuration as a guide, the file cache manager component 424 then starts cleaning up the local cache and loading new files as a background process for as long as the application 302 runs. The cache itself may be a standard directory on the device file system 402 and the files may be saved there in the same format as they were retrieved from the network 108. A combination of device specific rules for the total size of the cache, the cleanup section of the cache control, and the individual file cache control metadata will determine what older files are removed from the cache before loading starts or as it progresses. The cache manager component 424 will prevent the total cache size from exceeding a device specific value. The files themselves are retrieved from the network using a URL supplied in the individual file cache control metadata. The file cache manager component 424 also provides the ability for the application 302 and the connected peer (e.g., the automobile head unit 102) to add files to the cache list and/or override the cache metadata of a file in the cache control. Once added to the list, a file requested locally is handled using the caching rules described above.

The file cache manager component 424, for example, may provide two methods to retrieve file data: as a binary stream and as a file location in the form of a URL. A particular file may be requested as a binary stream by name from the file cache manager component 424 at any time. The request may optionally include cache metadata that overrides the metadata supplied in the cache control. If the requested file name is not in the cache control, it is added to the cache using either the metadata previously passed or default values for optional metadata. When a file is requested, the file cache manager component 424 will look first to see if it is currently in the cache. If it is not in the cache, the file cache manager component 424 will then request the file using the standard file cache rules, but moving it up in load order to that moment. For files already in the cache, the file is opened and the data is supplied as a binary stream. For files not yet in the cache, the file is retrieved from the network first, written to the file cache, and then opened as previously described.

The file cache manager component 424 may provide a second method of file access that is indirect and bypasses the automatic caching mechanism described above. In such a case, a file's location is requested by name and either the file cache manager returns a local file system URL (for example, "file://some/path/foo.bar") when the file is already in the cache or the file cache manager component 424 returns a network URL (for example "http://some.domain/foo.bar") when the file is not in the cache. The local system URL format will be device dependent.

As described above, caching metadata may be optionally provided and the requested file name does not have to already be in the cache control. However, in this case, the requested file is not automatically retrieved and normal cache loading procedures are applied to it. As a result, this method may return a network URL on one request and a file URL on a later request because the file has been loaded into the cache between those requests.

Cached files may be used by the application 302 associated with the peer communications framework control 404. The application may request the file data from the file cache manager component 424 as a binary stream or request the file location from the file cache manager component 424 and open it normally. Cached files are also available to the service provider component 410, which can then provide them to an external device such as an automobile head unit 102. In the present example, the binary stream method is used.

The cache control data that specifies the files and metadata used to maintain the cache may be generated on a client (e.g., the handheld communications device 104) or on a server within the server-based computer network 108 at runtime. How this data is generated may be as simple or as complex as needed and can change over time based upon needs of the application 302 or experience gained from tracking and monitoring types of files and actual use patterns of the application 302. The rules for caching applied on the server or the device (e.g., the handheld communications device 104) can be based on, but are not limited to, one or more of the following: files chosen by the application designers for likelihood of use or because they must be available on the device with a minimum time delay, files selected based on the current user's gestures (usage patterns), files selected based on aggregate user gestures, files selected based on user preferences, files selected based on the user's vehicle, files selected based on the user's current location, files selected based on the user's typical locations throughout the day, files selected based upon a partner or customer's requirements, files selected based on a connected device (e.g., the automobile head unit 102), and calling a service requesting the file in the future (e.g., the handheld communications device 104 service may update the server database as needed).

The initial implementation of the file selection process may be simple, adding complexity later as needs dictate. The handheld communications device client application (e.g., the service requester component 408) and the connected device (e.g., the automobile head unit 102) may request files from the cache which are not specified in the cache control data and those files will be cached normally after requested.

The service requester component 408 and service provider component 410 may each have corresponding client and server modules (e.g., HTTP client 412 and HTTP server 414 modules, respectively) to request and/or provide services via the peer network stack 306 or the general network stack 312 in order to support such requests and services coming from the application 302 and managed by the peer communications framework component 304. In one example embodiment, the peer network stack component 306 implements a minimal TCP/IP stack over appropriate serial data transport functionality. The data transport functionality may vary based upon the device and the peer communications framework control 404 configuration. The peer network stack 306 may, for example, include TCP functionality 416 at the transport layer, IP functionality 418 at the network layer, Serial Line Internet Protocol (SLIP) or Point to Point Protocol (PPP) functionality 420 at the data-link layer, and serial data transport functionality 422 such as Bluetooth® SPP or USB at the physical layer. For Bluetooth® SPP, the connection service name will use a specified value, for example "peer communications framework v1.0". The external device (e.g., the automobile head unit 102) may look for this value when enumerating the Bluetooth® profiles on the connecting device (e.g., the handheld communications device 104).

The service provider component 410 may be a minimal HTTP server with support for GET and POST semantics. Incoming HTTP requests resolve either to files in the file cache or to service requests, which are handled by native services of the peer communications framework control 304 or forwarded to the associated application 302 for servicing. Files may be requested using a specialized service native to the peer communications framework control 404 called "file" (e.g., http://168.100.10.1:80/file/filepath/filename.ext). Optional arguments can specify file-caching metadata, including the Internet URL the file is retrieved from. However, this is not an open proxy, as the Internet URL is subject to a match against cache control configuration options. Files may also be requested using an alias defined in the service configuration. In the present example, the file is requested using only the service name (e.g., "http://168.100.10.1:80/filealias"). Services may be requested by service name. (e.g., "http://168.100.10.1:80/servicename?foo=bar"). As the request may be in the form of an HTTP POST, it can include contents of any data type.

Services native to the peer communications framework control 404 are handled by the peer communications framework control 404 internally, after the application 302 is notified and given the option to abort the request. Application services are forwarded to the application 302 along with a "request" object that the application uses to determine the contents of the request and to respond to the request. The HTTP server 414 of the service provider component 410 may provide some services native to the service provider component 410. For example, these may include, but are not limited to, servicelist (which returns a list of available services using the same format as the service list in the configuration, filelist (which returns a list of available files, formatted as a service list), and file (which returns a file from the cache, adding it to the cache first if not already there). The service requester component 408 allows the application associated with the peer communications framework control 404 to make an HTTP request to the external peer device (e.g., the automobile head unit 102) using GET and POST semantics. Services are requested as defined by the external peer device and may be formed as HTTP GET or POST requests. For example, the request may be formed as "http://168.100.10.1:8080/servicename?foo=bar". To make the request, the application 302 gets a new request object from the peer communications framework control 404, sets its properties as needed and then calls the "send" method. The request object described above fires an event for success or for failure and the content of the response, if successful, is made available to the application 302 in the form of a binary stream.

Particular modules described above and other optional modules of the peer communications framework component 304 may or may not be present in other embodiments. However, excluding particular modules results in the device from which they are excluded not being able to act as an "anchor" device in the sense of being able to provide particular services to an external device that expects the full functionality of the peer communications framework component 304. For example, in the case of an external device (e.g., the automobile head unit 102) which has no connection to the Internet and therefore no need to cache and serve files, one can easily eliminate the file cache manager module 424 and the service provider component 410 (unless the particular external device needs to provide services other than cached files from the Internet).

Of the two peers participating in a connection between the "anchor" and external device as described above, only one need implement functionality of the peer communications framework component 304. The other peer may connect using any standards-compliant network stack with an appropriate data transport. For example, the automobile head unit 102 with a general network stack 308 and support for SLIP over Bluetooth® SPP (the external device) can connect to the handheld communications device 104 running the peer communications framework component 304 (the "anchor"). Each peer (e.g., the handheld communications device 104 and the automobile head unit 102) provides an appropriate data transport and a network stack capable of communicating via the appropriate network addresses, along with the protocol support required to make and handle service requests. Peers are provided this functionality by a peer communications framework component 304 library. Peers that do not have a peer communications framework component 304 implement this functionality separately. For example, this particular functionality may include data transport functionality (Bluetooth® SPP/SLIP or others), TCP/IP functionality, HTTP client functionality (to request services from the "anchor" peer), and other optional protocols. For example, peers that do not have a peer communications framework component (e.g., the automobile head unit 102) may optionally provide an HTTP server to act as a service provider to the "anchor" peer (e.g., the handheld communications device 104).

When two peers connect, one or more peers may receive information indicating that they are participating in a peer-to-peer network wherein one peer has a peer communications framework component 304 so they can configure themselves appropriately. The "anchor" peer is the peer that has the peer communications framework component 304 and will already be configured appropriately. However, the external peer may support other kinds of connections over the same physical serial transport and may learn what kind of connection has been initiated by the external peer looking for the value of the connection service name as described above.

Figure 5:
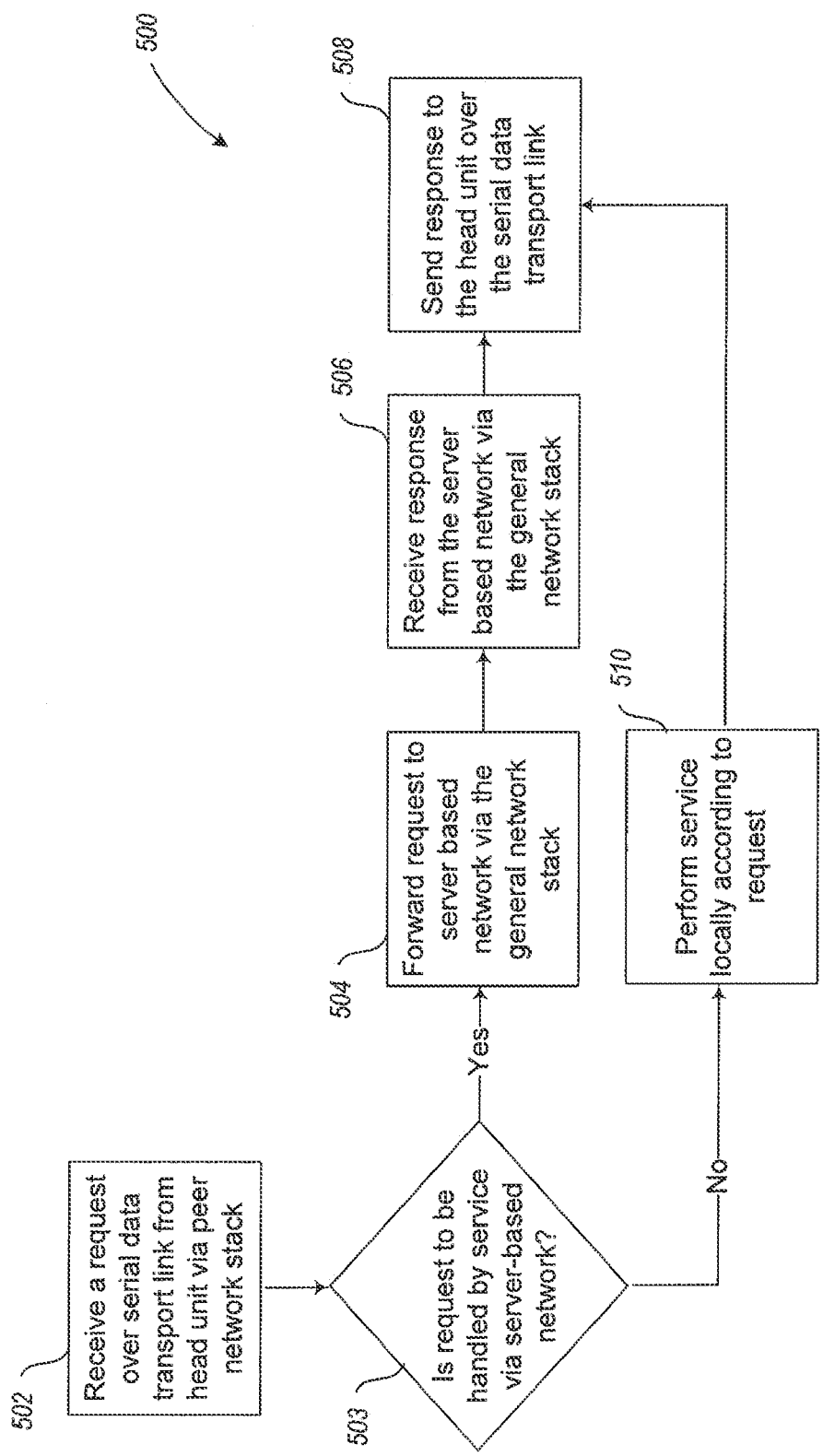
FIG. 5 is a flow diagram showing a method of providing communications between an automobile head unit, a handheld communications device, and a server-based computer network via which Internet access is provided, according to one illustrated embodiment.

FIG. 5 is a flow diagram showing a method 500 of providing communications between an automobile head unit of an automobile, a communications device, and a server-based computer network via which Internet access is provided, according to one illustrated embodiment.

The method starts at 502, in which a request may be received over a serial data transport link from the automobile head unit 102 via a peer-to-peer network stack. At 503 it may be determined whether the request is to be handled by a service via an external server-based network. For example, some services are available native to (i.e., locally on) the handheld communications device and others may be available via a server-based network external to the handheld communications device. An example of such a service that may be available locally on the handheld communications device may be one that changes the station on an Internet radio application. However, this determination of whether the request is to be handled by a service via an external server-based network would not be needed if all services were available natively on the handheld communications device or if no services were available natively on the handheld communications device and embodiments including such various processes and systems excluding such a decision are contemplated. If it is determined that the request is to be handled by a service via an external server-based network, then at 504 the request is forwarded to a server-based computer network via the general network stack of the device. At 506, the response is received from the server-based computer network via the general network stack and at 508 the response is sent to the automobile head unit over the serial data transport link. In one embodiment, the serial data transport link between the head unit and the communications device is either a Bluetooth® Serial Port Profile (SPP) type serial data transport link or Universal Serial Bus (USB) type serial data transport link.

If it is determined at 503 that the request is not to be handled by a service via an external server-based network, then at 510 the service is performed locally according to the request. For example, the service may be performed locally on the handheld communications device. At 508, the response resulting from the performance of the service is then sent to the automobile head unit over the serial data transport link. For example, in the case of the service being one that changes the station on an Internet radio application, the radio Internet station would be changed using a service locally on the handheld communications device without forwarding the request to an external network.

Figure 6:
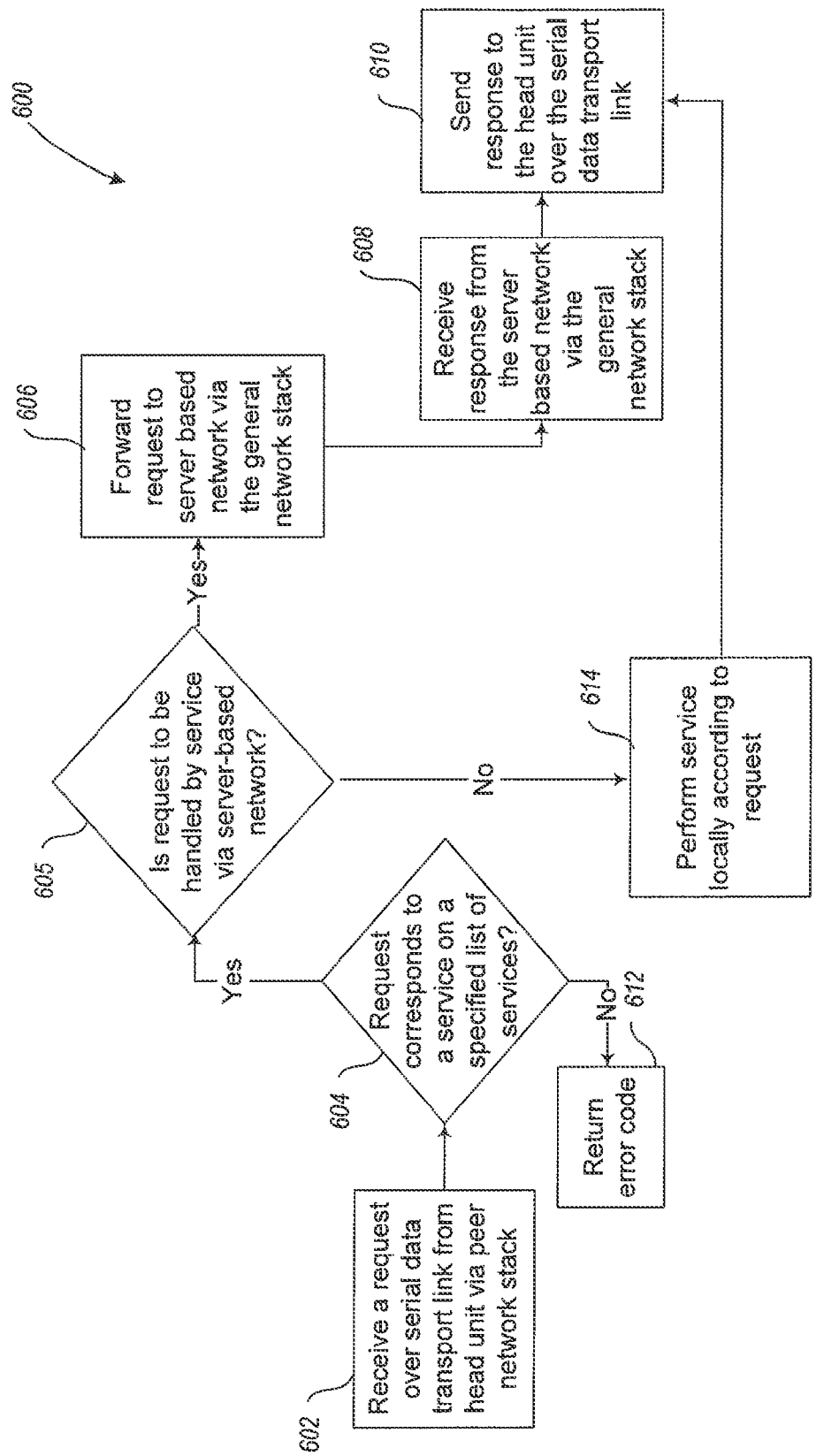
FIG. 6 is a flow diagram showing a method of providing communications between an automobile head unit, a communications device having a handheld form factor and a server-based computer network, including filtering service requests, according to one illustrated embodiment.

FIG. 6 is a flow diagram showing a method of providing communications between an automobile head unit, a communications device and a server-based computer network, including filtering service requests, according to one illustrated embodiment.

The method starts at 602, in which a request is received over serial data transport link from an automobile head unit via a peer-to-peer network stack. At 604 it may be determined whether the request corresponds to a service on a specified list of services. For example, the specified list of services may be a list of services available via a peer other than the automobile head unit (e.g., a handheld communications device). If it is determined that the request does not correspond to a service on the specified list of services, the method may then return an error code 612 (e.g., return an HTTP error code to a client requesting the service). At 606, if it had been determined that the request corresponds to a service on the specified list of services, then at 605 it may be determined whether the request is to be handled by a service via an external server-based network. For example, some services are available native to (i.e., locally on) the handheld communications device and others may be available via a server-based network external to the handheld communications device. An example of such a service that may be available locally on the handheld communications device may be one that changes the station on an Internet radio application. However, this determination of whether the request is to be handled by a service via an external server-based network would not be needed if all services were available natively on the handheld communications device or if no services were available natively on the handheld communications device and embodiments including such various processes and systems excluding such a decision are contemplated. If it is determined that the request is to be handled by a service via an external server-based network, then at 606 the request may be forwarded to a server-based computer network via a general network stack. For example, the general network stack resides on the same device (e.g., the communications device) on which the peer-to-peer network stack resides. At 608 a response is received from the server-based computer network via the general network stack. At 610, the response may then be sent to the automobile head unit over the serial data transport link.

If it is determined at 604 that the request is not to be handled by a service via an external server-based network, then at 614 the service is performed locally according to the request. For example, the service may be performed locally on the handheld communications device. At 614, the response resulting from the performance of the service is then sent to the automobile head unit over the serial data transport link. For example, in the case of the service being one that changes the station on an Internet radio application, the radio Internet station would be changed using a service locally on the handheld communications device without forwarding the request to an external network.

Figure 7:
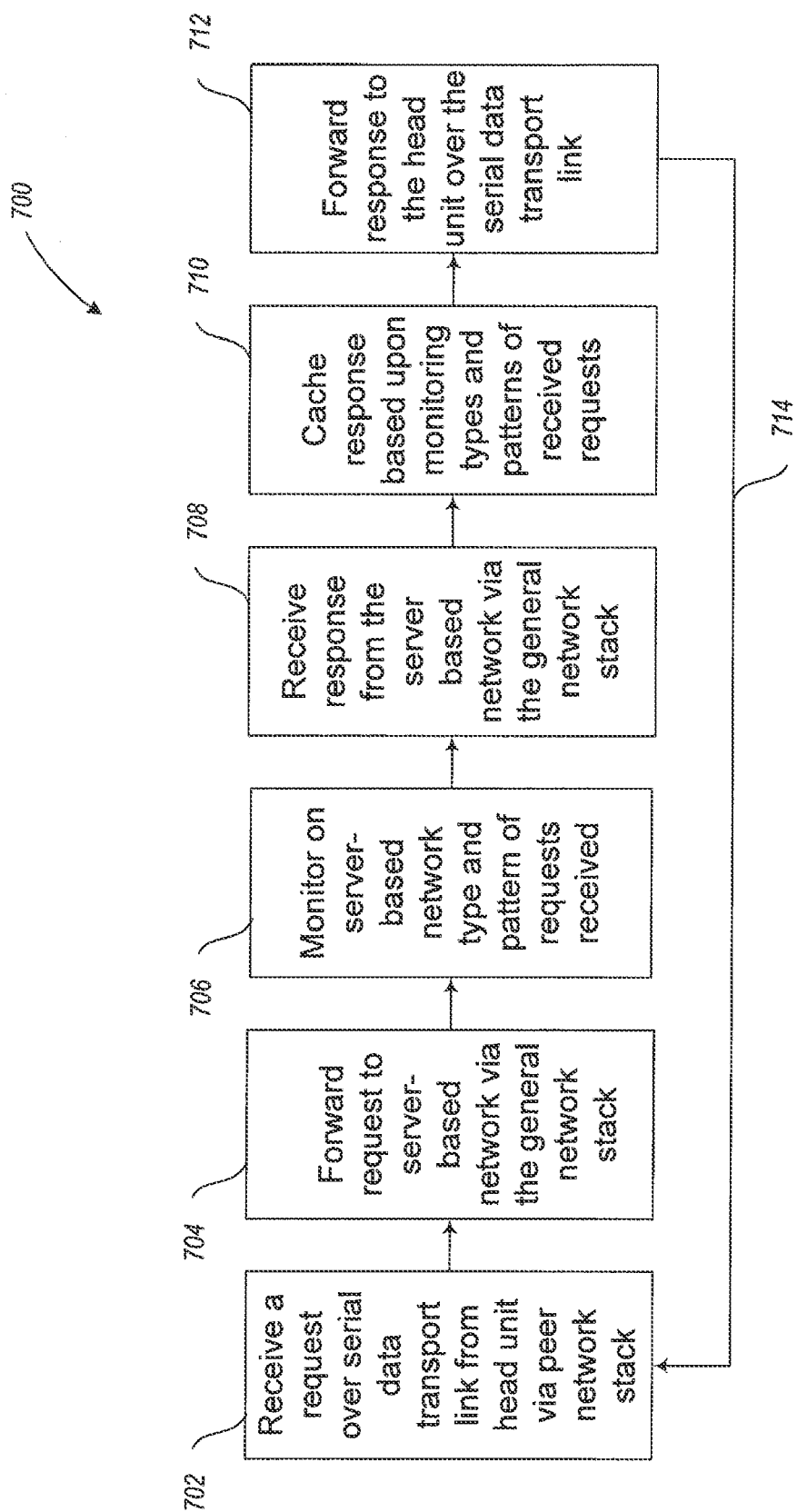
FIG. 7 is a flow diagram showing a method of providing communications between an automobile head unit, a communications having a handheld form factor device and a server-based computer network, including intelligent caching, according to one illustrated embodiment.

FIG. 7 is a flow diagram showing a method of providing communications between an automobile head unit, a communications device and a server-based computer network, including intelligent caching, according to one illustrated embodiment.

The method starts at 702, in which a request is received over a serial data transport link from the automobile head unit via a peer-to-peer network stack. For example the request may be received at the communications device on the peer network having a peer-to-peer connection with the automobile head unit. At 704, the request is forwarded to a server-based computer network via a general network stack. For example, the general network stack resides on the same device (e.g., the communications device) on which the peer-to-peer network stack resides. At 706, types and patterns of requests received are monitored. For example, this monitoring is performed on one or more servers on the server-based computer network but, optionally, may also or instead be performed locally on the communications device. At 708, a response is received from the server-based computer network via the general network stack. At 710 the response (or at least a portion of the response) may be cached based upon the monitoring types and patterns of the received requests. For example, the response may be received and at least a portion of the response cached on the communications device according to various caching data received from the server-based computer network indicating what files or responses to cache on the communications device. The method may then repeat 714 starting at 702 as more requests are received.

Figure 8:
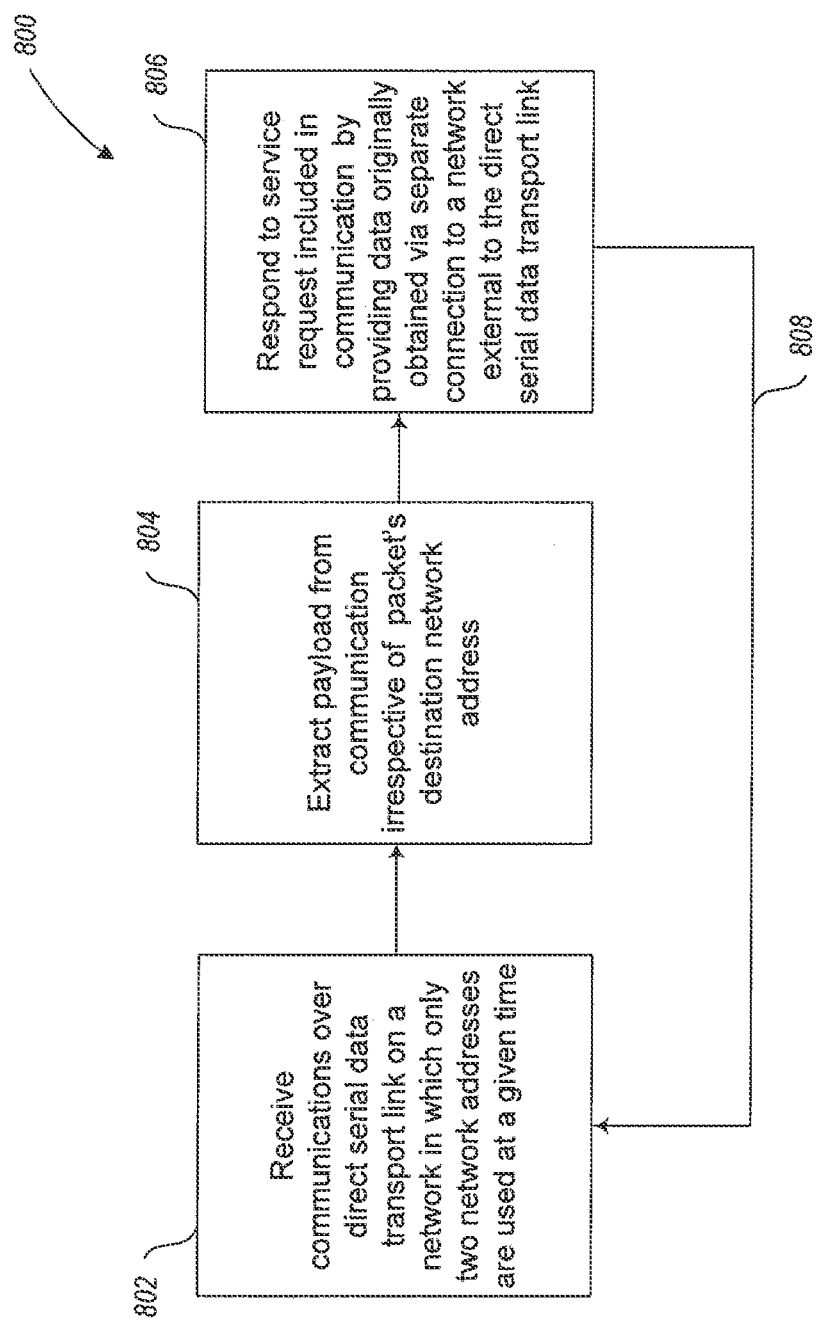
FIG. 8 is a flow diagram showing a method for communicating in a communication network environment between a first and a second network peer over a direct serial data transport link including responding by the first network peer to a service request included in one or more of the communications, according to one illustrated embodiment.

FIG. 8 is a flow diagram showing a method 800 for communicating in a communication network environment between a first and a second network peer over a direct serial data transport link including responding by the first network peer to a service request included in one or more of the communications, according to one illustrated embodiment.

The method starts at 802, in which communications are received over a direct serial data transport link on a network in which only two network addresses are used at a given time. There may be an established data transport connection between the first network peer and the second network peer over the direct serial data transport link and the first network peer may have a separate connection over a separate network interface to a network external to the link. At 804, a payload is extracted from a communication received irrespective of the communication packet's destination network address. For example, the destination network address may be ignored or otherwise not used. Also, the established data transport connection between the first network peer and the second network peer on the direct serial data transport link may be one in which resolution of network addresses of the first network peer and the second network peer to hardware addresses of the first network peer and the second network peer is not necessary for the responding by the first network peer to the service request. At 806 a service request included in the communication is responded to by providing data that was originally obtained via the separate connection to a network external to the direct serial data transport link. For example, the network external to the direct serial data transport link may be the Internet. The method may then repeat 808 starting at 802 as more communications are received.

FIG. 9 is a flow diagram showing a method 900 for communicating in a communication network environment between a first and a second network peer over a direct serial data transport including handling the communications received which have requests for particular network services, according to one illustrated embodiment.

The method starts at 902, in which a communication is received over a direct serial data transport link by a first network peer from second network peer. At 904, the communication received is then handled such that the second network peer is not required to know that it is on a peer-to-peer network as opposed to a more general network in order. The second network peer is enabled to handle network communications in a same manner as if the first network peer did provide particular general network services, even if the first network peer does not provide the requested network service. A corresponding response from the first network peer will handle a service request in the communication in an appropriate manner according to the particular network protocol (e.g., TCP/IP) to enable further communications between the first and second network peer without interrupting the connection. For example, if the first network peer does not provide services such as Dynamic Host Configuration Protocol (DHCP) or Address Resolution Protocol (ARP), requests for such services will be ignored or otherwise responded to in a manner enabling the requester to continue communications in a normal manner without interrupting the current network connection or session. The method may then repeat 906 starting at 902 as more communications are received.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other devices, not necessarily the exemplary automobile head unit 102 and handheld communications device 104 generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. Those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software or firmware and stored in memory, logic or information can be stored on any computer-readable medium (i.e., processor-readable storage medium) for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" or "processor-readable storage medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    receiving, from a head unit of an automobile and by a communications device having a handheld form factor, a request for functionality from a remote server;
    determining, by the communications device, whether to provide the head unit with the requested functionality using only information previously stored on the communications device;
    in response to determining to provide the requested functionality using only the information previously stored on the communications device, providing the requested functionality by sending at least some of the information previously stored on the communications device to the head unit, and otherwise:
    sending an updated request to the remote server for the requested functionality; and
    forwarding, by the communications device, at least a portion of information received from the remote server to provide the requested functionality to the head unit.

2. The method of claim 1 wherein the sending of the updated request to the remote server for the requested functionality includes sending the request via a general network protocol stack of the communications device, and wherein the forwarding of the at least a portion of information received from the remote server to provide the requested functionality includes forwarding the at least a portion of information to the head unit via a peer-to-peer network protocol stack of the communications device.

3. The method of claim 1 wherein the information previously stored on the communications device is previously stored on the communications device based on monitoring, by the communications device, of types and patterns of requests received via a peer-to-peer network protocol stack of the communications device.

4. The method of claim 1 wherein the forwarding of the at least a portion of information received from the remote server includes forwarding the at least a portion of information to the head unit via a serial data transport link that includes at least one of a Bluetooth® type or Universal Serial Bus (USB) type serial data transport link.

5. A method, comprising:
    receiving, by a communications device, one or more requests from a head unit of an automobile for functionality from an indicated network-accessible service;
    determining, by the communications device, that at least one of the one or more requests cannot be handled locally by the communications device; and
    providing, by the communications device and based at least in part on the determining, a requested functionality in response to the at least one of the one or more requests by:
    forwarding the at least one of the one or more requests to the indicated network-accessible service from the communications device via a general network protocol stack of the communications device;
    receiving a response from the indicated network-accessible service via the general network protocol stack; and
    forwarding at least a portion of the received response to the head unit via a peer-to-peer network protocol stack of the communications device that is separate from the general network protocol stack of the communications device.

6. The method of claim 5, further comprising:
    receiving one or more additional requests from the head unit for functionality from the indicated network-accessible service;
    determining that the one or more additional requests for the functionality from the indicated network-accessible service are to be handled locally by the communications device; and
    responsive to the determination, providing the one or more additional requested functionality locally via the peer-to-peer network protocol stack of the communications device.

7. The method of claim 5 wherein network packets sent from the head unit containing the one or more requests do not include a network address of the communications device.

8. The method of claim 5, further comprising:
    configuring a user interface of the head unit to visually match a corresponding user interface of the communications device by communicating information over a serial data transport link from the communications device to the head unit, the visually matched user interface including one or more controls of the communications device.

9. The method of claim 8 wherein the information included in the at least a portion of the received response forwarded to the head unit is for display on the user interface of the head unit configured to visually match the corresponding user interface of the communications device.

10. The method of claim 5, further comprising:
receiving, by the communications device and from the head unit, at least one additional request for functionality from a second indicated network-accessible service;
determining whether the second indicated network-accessible service corresponds to a service on a specified list of services; and
providing the at least one additional requested functionality only if it is determined that the second indicated network-accessible service corresponds to the service on the specified list of services.

11. The method of claim 5, further comprising:
caching at least a portion of the received response on the communications device based upon previous monitoring of types and patterns of the received one or more requests.

12. The method of claim 5 wherein the head unit and the communications device are communicatively coupled via a serial data transport link that is one of a Bluetooth® Serial Port Profile (SPP) type serial data transport link or a Universal Serial Bus (USB) type serial data transport link.

13. A system, comprising:
at least one processor;
at least one non-transitory processor-readable storage medium coupled to the at least one processor;
a peer communications control component that is under control of the at least one processor;
a first communications component that is communicatively coupled to the peer communications control component and has a peer-to-peer network protocol stack to receive requests through a data transport connection from a head unit of an automobile and forward requests to the peer communications control component; and
a second communications component that is communicatively coupled to the peer communications control component and has a general network protocol stack to exchange communications with a server-based network that is external to the data transport connection, and wherein the second communications component:
in response to a first request for functionality of an indicated service received from the first communications component via the peer communications control component, determines that the first request cannot be satisfied locally;
based at least in part on the determination that the first request cannot be satisfied locally, forwards the first request to the indicated service via the server-based network using the general network protocol stack;
based at least in part on the forwarded first request, receives a response from the indicated service via the general network protocol stack; and
provides at least a portion of the response to the first communications component for forwarding to the head unit via the peer-to-peer network protocol stack.

14. The system of claim 13 wherein the at least one processor, the at least one non-transitory processor-readable storage medium, the peer communications control component, the first communications component, and the second communications component are all housed within a communications device having a handheld form factor.

15. The system of claim 13 further comprising a user interface having one or more user-selectable controls, wherein the peer communications control component causes a user interface of the head unit to visually match the user interface of the system.

16. The system of claim 15 wherein the peer communications control component configures the user interface of the head unit to visually match the user interface of the system by communicating information over a serial data transport link from the first communications component to the head unit for use by the head unit to configure the user interface of the head unit to visually match the user interface of the system.

* * * * *